US010545443B2

(12) United States Patent
Kobayashi et al.

(10) Patent No.: US 10,545,443 B2
(45) Date of Patent: Jan. 28, 2020

(54) IMAGE FORMING APPARATUS INCORPORATING INFORMATION DETECTOR

(71) Applicants: Yukifumi Kobayashi, Kanagawa (JP); Hideyo Makino, Tokyo (JP); Tetsuya Ofuchi, Kanagawa (JP); Takayuki Nishimura, Kanagawa (JP); Yasuyuki Sekino, Kanagawa (JP); Tohru Matsumoto, Kanagawa (JP); Noriaki Takenaga, Tokyo (JP); Satoshi Nakayama, Kanagawa (JP)

(72) Inventors: Yukifumi Kobayashi, Kanagawa (JP); Hideyo Makino, Tokyo (JP); Tetsuya Ofuchi, Kanagawa (JP); Takayuki Nishimura, Kanagawa (JP); Yasuyuki Sekino, Kanagawa (JP); Tohru Matsumoto, Kanagawa (JP); Noriaki Takenaga, Tokyo (JP); Satoshi Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/058,019

(22) Filed: Aug. 8, 2018

(65) Prior Publication Data
US 2018/0364627 A1 Dec. 20, 2018

Related U.S. Application Data

(63) Continuation of application No. 15/445,023, filed on Feb. 28, 2017, now Pat. No. 10,073,396, which is a
(Continued)

(30) Foreign Application Priority Data

Sep. 30, 2014 (JP) .................................. 2014-200838

(51) Int. Cl.
G03G 15/00 (2006.01)
H04N 1/00 (2006.01)
(Continued)

(52) U.S. Cl.
CPC ............ G03G 15/50 (2013.01); B41J 11/009 (2013.01); B41J 29/00 (2013.01); G06K 15/1868 (2013.01);
(Continued)

(58) Field of Classification Search
CPC .. G03G 15/50; G03G 15/0863; G03G 15/502; G03G 2215/0697; G03G 15/5087
(Continued)

(56) References Cited

U.S. PATENT DOCUMENTS 4,477,178 A 10/1984 Furuichi et al.
4,782,365 A 11/1988 Takagi
(Continued)

FOREIGN PATENT DOCUMENTS

JP H 08328429 A 12/1996
JP 2004-122766 A 4/2004
(Continued)

OTHER PUBLICATIONS

Japanese Communication with Dispatch No. 158367 issued by the Japan Patent Office dated Apr. 20, 2018 for Japanese Patent Application No. 2014-200838.

Primary Examiner — Walter L Lindsay, Jr.
Assistant Examiner — Frederick Wenderoth
(74) Attorney, Agent, or Firm — Harness, Dickey and Pierce, P.L.C.

(57) ABSTRACT

An image forming apparatus includes an information obtainer, a memory, a candidate determining unit, and an image forming device. The information obtainer obtains feature information from the target recording medium. The
(Continued)

memory stores at least one set of recording medium information regarding the target recording medium associated with the feature information and at least one set of image forming condition information corresponding to the recording medium information. The recording medium information is identification information. The candidate determining unit determines a candidate recording medium information from the recording medium information stored in the memory based on the feature information of the target recording medium obtained by the information obtainer. The image forming device forms an image on the target recording medium based on the image forming condition information in the memory according to the candidate recording medium information determined by the candidate determining unit.

17 Claims, 15 Drawing Sheets

Related U.S. Application Data continuation of application No. 14/867,381, filed on Sep. 28, 2015, now Pat. No. 9,621,752.

(51) Int. Cl.
*B41J 11/00* (2006.01)
*G06K 15/02* (2006.01)
*G06K 15/00* (2006.01)
*B41J 29/00* (2006.01)

(52) U.S. Cl.
CPC ..... *G06K 15/4065* (2013.01); *H04N 1/00726* (2013.01); *H04N 1/00734* (2013.01)

(58) Field of Classification Search
USPC ............................................................ 399/83
See application file for complete search history.

(56) References Cited

U.S. PATENT DOCUMENTS

| | | |
|---|---|---|
| 5,031,116 A | 7/1991 | Shukunami et al. |
| 9,432,537 B2 | 8/2016 | Tachibana |
| 2002/0147667 A1 | 10/2002 | Shiba et al. |
| 2005/0078973 A1 | 4/2005 | Suzuki |
| 2006/0285900 A1 | 12/2006 | Kurita |
| 2009/0066008 A1 | 3/2009 | Hirose et al. |
| 2010/0328688 A1 | 12/2010 | Sakamoto et al. |
| 2011/0199630 A1 | 8/2011 | Oozawa |
| 2012/0062928 A1 | 3/2012 | Tsubouchi |
| 2012/0120420 A1 | 5/2012 | Miyazaki |
| 2012/0134693 A1 | 5/2012 | Hoshi et al. |
| 2013/0016376 A1* | 1/2013 | Hashidume ............ G03G 21/00 358/1.9 |
| 2013/0194573 A1 | 8/2013 | Ohba et al. |
| 2015/0151938 A1 | 6/2015 | Matsumoto et al. |
| 2015/0186762 A1 | 7/2015 | Nishimura et al. |

FOREIGN PATENT DOCUMENTS

| | | |
|---|---|---|
| JP | 201283707 A | 4/2012 |
| JP | 2012103522 A | 5/2012 |
| JP | 2012128393 A | 7/2012 |
| JP | 2013-182359 A | 9/2013 |

* cited by examiner

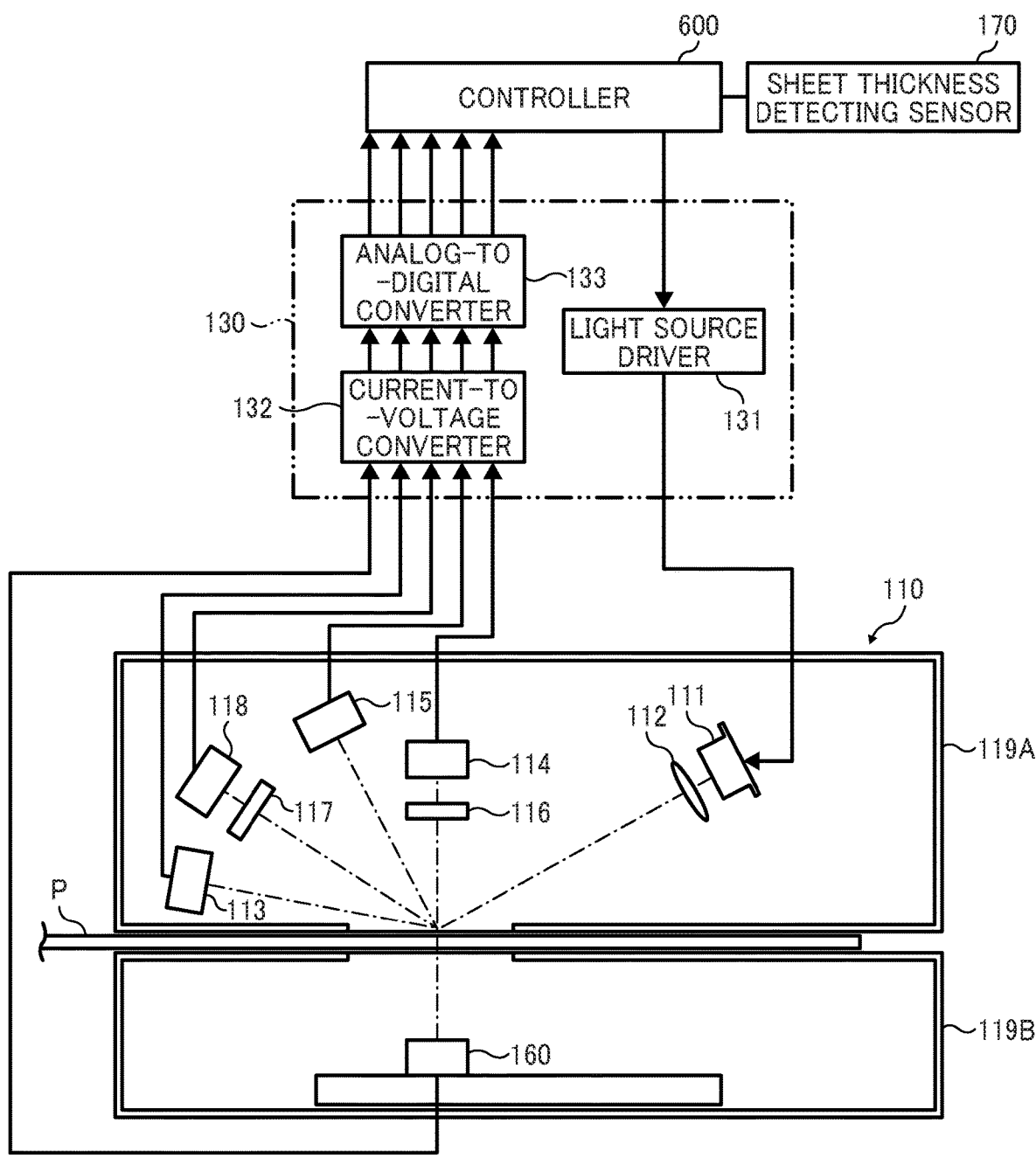

FIG. 18

| SHEET DESCRIMINATION INFORMATION | | | | | SHEET CHARACTERISTIC INFORMATION | | | | | | IMAGE FORMING CONDITION INFORMATION | |
|---|---|---|---|---|---|---|---|---|---|---|---|---|
| SHEET NAME | SHEET SIZE | WEIGHT [gsm] | SHEET TYPE | COATED/ UNCOATED | A [mV] | B [mV] | C [mV] | D [mV] | E [mV] | F [mV] | TRANSFER VOLTAGE VALUE [mV] | FIXING TEMPERATURE [°C] |
| COATED PAPER A | A4 | 120 | PLAIN PAPER | GLOSS COATED PAPER | 1252 | 1125 | 2288 | 452 | 1132 | 842 | 40 | 140 |
| PLAIN PAPER B | A3 | 75 | PLAIN PAPER | PLAIN PAPER | 852 | 725 | 1588 | 152 | 832 | 542 | 40 | 120 |
| COLORED PAPER C | A3 | 75 | COLORED PAPER (YELLOW) | PLAIN PAPER | 403 | 433 | 811 | 53 | 242 | 124 | 44 | 155 |

FIG. 19

| PRECISION RATIO | SHEET NAME | SHEET SIZE | WEIGHT | SHEET TYPE | COATED/ UNCOATED |
|---|---|---|---|---|---|
| 98% | D MATTE | A3 | 300gsm | PLAIN PAPER | MATTE COAT |
| 95% | MATTE PAPER E | DLT | 290gsm | PLAIN PAPER | MATTE COAT |
| 90% | F COAT | A4 | 310gsm | PLAIN PAPER | MATTE COAT |

| FIRST SHEET FEED TRAY | 1 | D MATTE | | | |
|---|---|---|---|---|---|
| SECOND SHEET FEED TRAY | | A3 | 300gsm | PLAIN PAPER | MATTE COAT |

IMAGE FORMING APPARATUS INCORPORATING INFORMATION DETECTOR

CROSS-REFERENCE TO RELATED APPLICATIONS

This application is a continuation of U.S. application Ser. No. 15/445,023, filed on Feb. 28, 2017, which is a continuation of U.S. application Ser. No. 14/867,381 filed on Sep. 28, 2015, which claims priority pursuant to 35 U.S.C. § 119(a) to Japanese Patent Application No. 2014-200838, filed on Sep. 30, 2014, in the Japan Patent Office, the entire contents of each of which is hereby incorporated by reference herein.

BACKGROUND

Technical Field

Example embodiments relate to an image forming apparatus incorporating an information detector.

Related Art

In known image forming processes, to achieve higher printing quality, an image forming apparatus automatically discriminates types of recording media and sets image forming conditions according to the detected types of recording media.

An example of an image forming apparatus shows a configuration in which an information detecting sensor is disposed inside the image forming apparatus to detect information of a recording medium being conveyed in a sheet conveying path.

This image forming apparatus includes an optical sensor that functions as an information detector to detect information on a recording medium optically. The optical sensor has a light emitting element and a light receiving element therein. The light emitting element of the information detector emits light to a surface of a recording medium. Among the light emitted by the light emitting element, the light reflected on the surface of the recording medium is received by a reflection light receiving element, so that the information detector can detect information on the features of a recording medium to specify the type of the recording medium based on optical information including a light amount of the received light. Based on the information on the features of the recording medium thus detected by the information detector, a controller distinguishes the type of recording medium such as a plain paper and a coated paper using a reference table such as a lookup table so as to set image forming conditions according to the type of the recording medium.

SUMMARY

At least one aspect of this disclosure provides an image forming apparatus including an information obtainer, a memory, a candidate determining unit, and an image forming device. The information obtainer obtains feature information of a target recording medium from the target recording medium. The memory stores at least one set of recording medium information regarding the target recording medium associated with the feature information and at least one set of image forming condition information corresponding to the recording medium information. The recording medium information is identification information that is discriminated from another recording medium. The candidate determining unit determines a candidate recording medium information from the at least one set of the recording medium information stored in the memory based on the feature information of the target recording medium obtained by the information obtainer. The image forming device forms an image on the target recording medium based on the image forming condition information in the memory according to the candidate recording medium information determined by the candidate determining unit.

BRIEF DESCRIPTION OF THE DRAWINGS

FIG. 5 is a diagram illustrating a configuration of an optical sensor and a processing device;

FIG. 18 is a flowchart illustrating an example of image forming processes of the image forming apparatus;

FIG. 19 is a diagram illustrating an example of a display window showing results of sheet discrimination; and FIG. 20 is a diagram illustrating a display window showing a tray setting of a recording medium information storing part.

DETAILED DESCRIPTION

Figure 1:
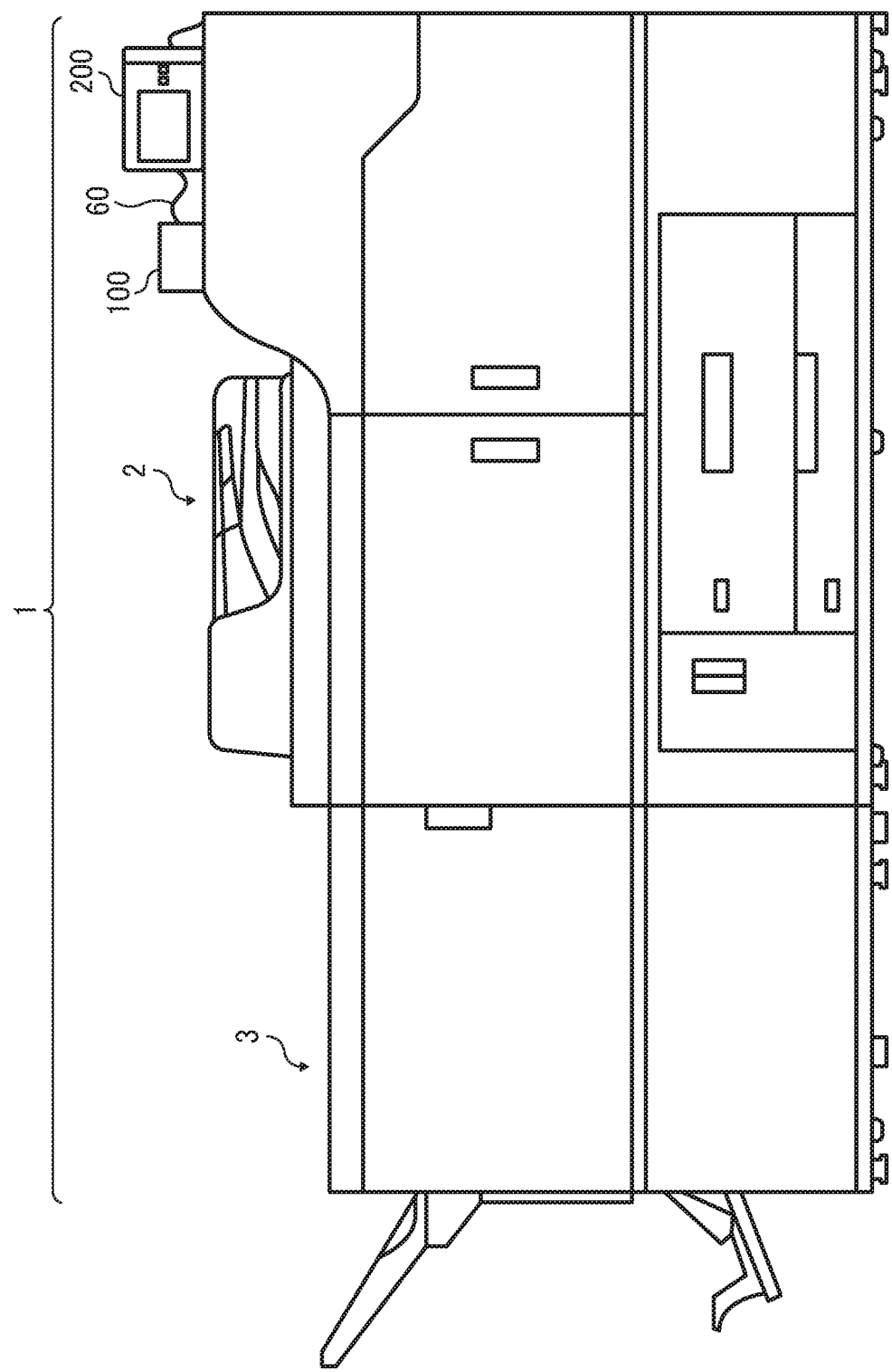
FIG. 1 is a diagram illustrating a configuration of an image forming system according to an example embodiment.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Next, a description is given of a configuration of an image forming system 1 according to an example of this disclosure, with reference to FIG. 1.

As illustrated in FIG. 1, the image forming system 1 includes an image forming apparatus 2 and a sheet finishing apparatus 3 that functions as a sheet finisher.

Further, an information detector 100 that functions as an information obtainer is disposed in the image forming system 1 outside the image forming apparatus 2. Details of the information detector 100 is described below.

The image forming apparatus 2 and the sheet finishing apparatus 3 are connected to communicate with each other. In the image forming system 1, after the image forming apparatus 2 has formed an image on the sheet P, the sheet finishing apparatus 3 accepts the sheet P from the image forming apparatus 2 for various post-processing operations to the sheet P.

The post-processing operations include, for example, a side stitching operation, a center folding process, and the like. The center folding process includes a saddle stitching operation. The sheet finishing apparatus 3 that executes the above-described various post-processing operations includes a sheet discharging mode, a side stitching mode, and a saddle stitching mode.

Figure 2:
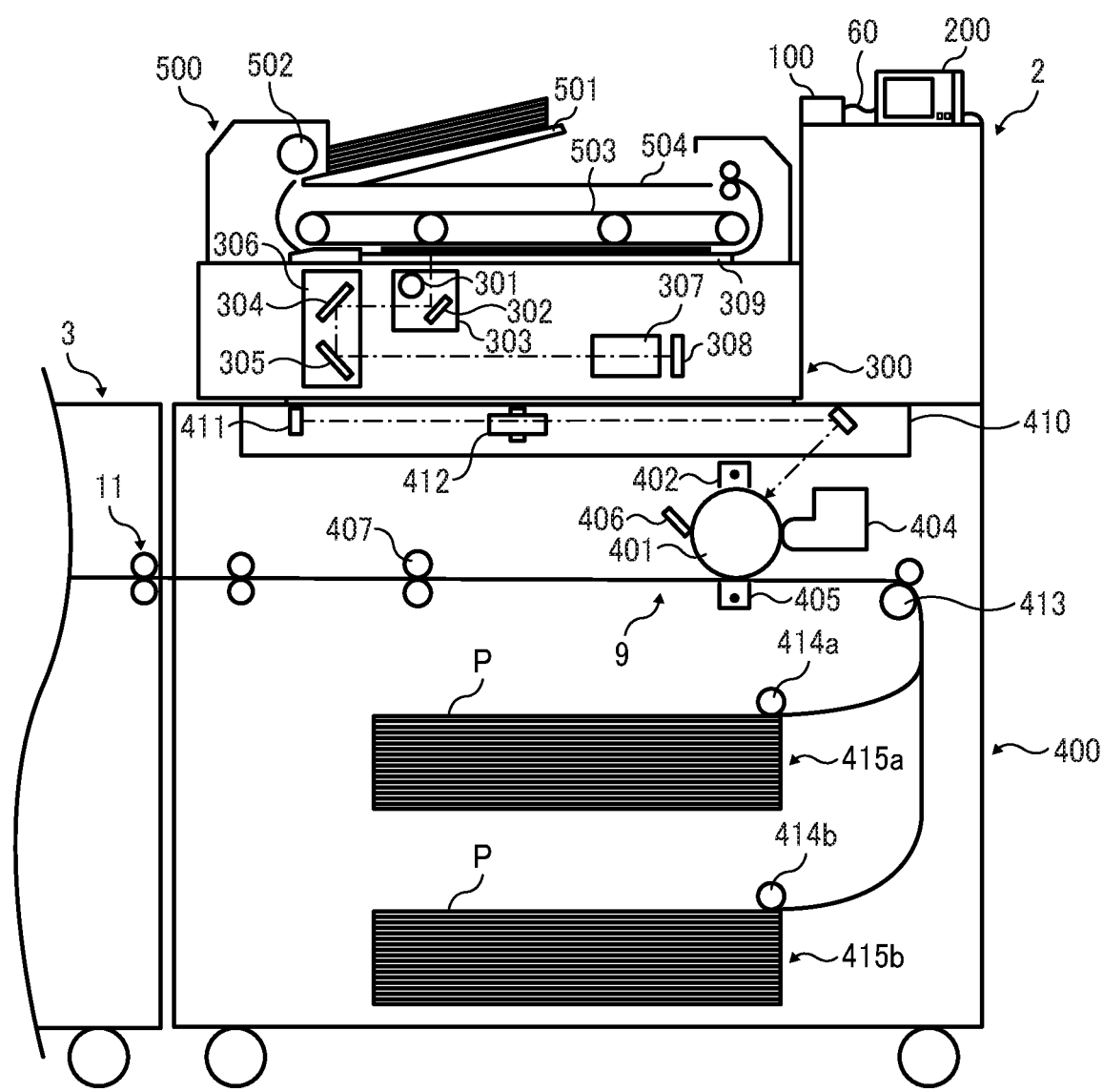
FIG. 2 is a diagram illustrating a configuration of an image forming apparatus included in the image forming system of FIG. 1.

FIG. 2 is a diagram illustrating a configuration of the image forming apparatus 2 included in the image forming system 1 of FIG. 1.

The image forming apparatus 2 may be a copier, a printer, a scanner, a facsimile machine, a plotter, and a multifunction peripheral or a multifunction printer (MFP) having at least one of copying, printing, scanning, facsimile, and plotter functions, or the like. According to the present example, the image forming apparatus 2 is an electrophotographic printer that forms toner images on a sheet or sheets by electrophotography.

More specifically, the image forming apparatus 2 functions as a printer. However, the image forming apparatus 2 can expand its function as a copier by adding a scanner as an option disposed on top of an apparatus body of the image forming apparatus 2. The image forming apparatus 2 can further obtain functions as a facsimile machine by adding an optional facsimile substrate in the apparatus body of the image forming apparatus 2.

Further, this disclosure is also applicable to image forming apparatuses adapted to form images through other schemes, such as known ink jet schemes, known toner projection schemes, or the like as well as to image forming apparatuses adapted to form images through electro-photographic schemes.

Further, it is to be noted in the following examples that: the term "image forming apparatus" indicates an apparatus in which an image is formed on a recording medium such as paper, OHP (overhead projector) transparencies, OHP film sheets, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

The image forming apparatus 2 includes an apparatus body 400, an image reading device 300, and an automatic document feeder (ADF) 500.

The apparatus body 400 encases an image forming part 9, a first sheet tray 415a, and a second sheet tray 415b therein. The first sheet tray 415a and the second sheet tray 415b are vertically disposed below the image forming part 9. The first sheet tray 415a and the second sheet tray 415b have a first sheet feed roller 414a and a second sheet feed roller 414b, respectively, and accommodate the sheet P. After the sheet P being fed by a selected one of the first sheet feed roller 414a and the second sheet feed roller 414b, the sheet P accommodated in each of the first sheet tray 415a and the second sheet tray 415b is conveyed upwardly along a corresponding sheet conveying path before reaching a registration roller pair 413.

The image forming part 9 includes a photoconductor drum 401 that functions as an image bearer, a charger 402, an exposing device 410, a developing device 404, a transfer device 405, and a cleaning device 406.

The charger 402 uniformly charges a surface of the photoconductor drum 401.

The exposing device 410 is a latent image forming device to form an electrostatic latent image on the surface of the photoconductor drum 401 based on image data read by the image reading device 300.

The developing device 404 supplies toner to adhere to the electrostatic latent image formed on the surface of the photoconductor drum 401 and develops the electrostatic latent image into a visible toner image.

The transfer device 405 is an image transfer body to transfer the visible toner image on the photoconductor drum 401 onto the sheet P.

The cleaning device 406 is a cleaner to remove residual toner remaining on the surface of the photoconductor drum 401 after transfer of the toner image onto the sheet P.

The image forming apparatus 2 further includes a fixing device 407 that is disposed downstream from the image forming part 9 in a sheet conveying direction. The fixing device 407 functions as a fuser to fix the toner image to the sheet P.

The exposing device 410 include a laser unit 411 and a polygon mirror 412.

The laser unit 411 emits laser light based on the image data under control of a controller provided to the apparatus body 400.

The polygon mirror 412 scans the laser light emitted by the laser unit 411 in a direction of rotation axis of the photoconductor drum 401 (i.e., in a main scanning direction).

The image reading device 300 functions as an image reader to read image data of an original document.

The ADF 500 is disposed above the image reading device 300 and is connected to the image reading device 300. The ADF 500 includes a document table 501, a document feed roller 502, a transfer belt 503, and a document discharging tray 504.

When original documents are set on the document table 501, upon receipt of a signal to start reading image data of the original documents, the document feed roller 502 of the ADF 500 feeds the original documents placed on the document table 501 one by one. Each original document fed by the document feed roller 502 is guided by the transfer belt 503 to a contact glass 309 and is halted on the contact glass 309 temporarily.

With the original document halted on the contact glass 309, the image reading device 300 reads the image data of the original document. Thereafter, the transfer belt 503 resumes to convey the original document to the document discharging tray 504.

Next, a description is given of a series of image reading processes and a series of image forming processes.

Either when the ADF 500 feeds the original document to the contact glass 309 or when a user places the original document on the contact glass 309 manually and inputs a copy start instruction via a control panel 200, a light source 301 mounted on a first moving unit 303 emits light. Along with the light emission, the first moving unit 303 and a second moving unit 306 are moved along a guide rail.

As the light source 301 emits the light onto the original document placed on the contact glass 309, the reflection light reflects on the original document. The reflection light is guided to a mirror 302 mounted on the first moving unit 303 and mirrors 304 and 305 mounted on the second moving unit 306 to a lens 307 so as to be received by a CCD 308. As a result, the CCD 308 reads the image data of the original document and the read image data is converted from analog data to digital data by an analog/digital (A/D) conversion circuit provided to the image forming apparatus 2. The image data is then transmitted from a data output port of the image reading device 300 to the controller of the apparatus body 400.

By contrast, the apparatus body 400 starts driving the photoconductor drum 401. As the photoconductor drum 401 rotates at a given speed, the charger 402 uniformly charges the surface of the photoconductor drum 401. The exposing device 410 then exposes light to the surface of the photoconductor drum 401 to form the electrostatic latent image based on the image data read by the image reading device 300.

Then, the developing device 404 develops the electrostatic latent image formed on the surface of the photoconductor drum 401 into a visible toner image. The sheet P is fed from a selected one of the first sheet tray 415a and the second sheet tray 415b by a corresponding one of the first sheet feed roller 414a and the second sheet feed roller 414b and temporarily stopped at the registration roller pair 413.

In synchronization with timing at which the leading end of the toner image formed on the surface of the photoconductor drum 401 reaches an image transfer part that is located facing the transfer device 405, the registration roller pair 413 conveys the sheet P to the image transfer part. When the sheet P passes the image transfer part, the toner image formed on the surface of the photoconductor drum 401 is transferred onto the sheet P due to an action of an electric field in a transfer nip region.

Thereafter, the sheet P having the toner image on the surface thereof is conveyed to the fixing device 407 so that the fixing device 407 fixes the toner image to the sheet P. Then, the sheet P is discharged to the sheet finishing apparatus 3.

It is to be noted that residual toner remaining on the surface of the photoconductor drum 401 without being transferred onto the sheet P at the image transfer part is removed from the photoconductor drum 401 by the cleaning device 406.

Figure 3:
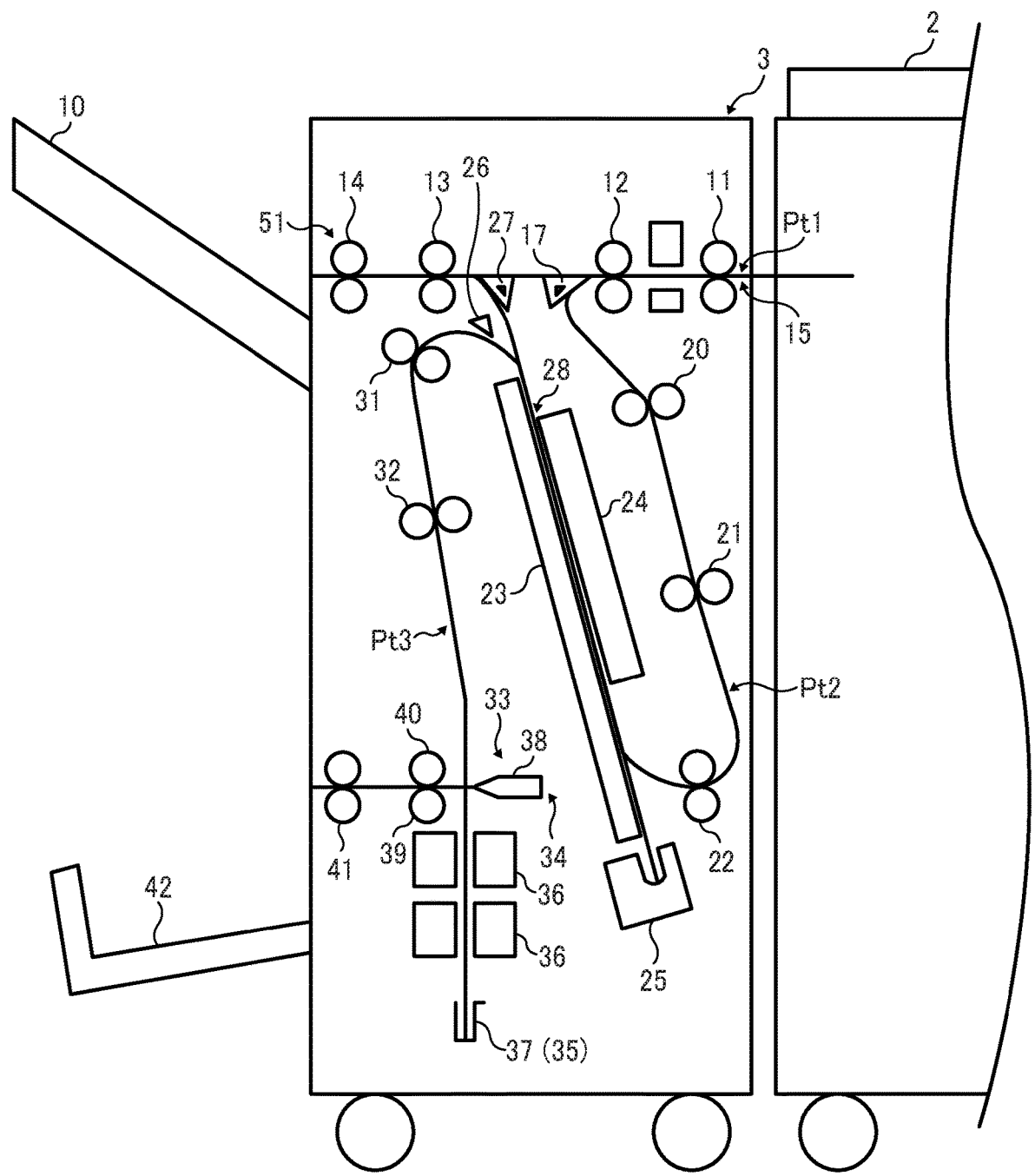
FIG. 3 is a diagram illustrating a configuration of a sheet finisher included in the image forming system of FIG. 1.

A description is given of the sheet finishing apparatus 3 with reference to FIG. 3.

FIG. 3 is a diagram illustrating a configuration of the sheet finishing apparatus 3 included in the image forming system 1 illustrated in FIG. 1.

The sheet finishing apparatus 3 includes a first conveying path Pt1, a second conveying path Pt2, and a third conveying path Pt3. The first conveying path Pt1 is a path through which the sheet P discharged from the image forming apparatus 2 travels to a first sheet discharging tray 10. The second conveying path Pt2 branches from the first conveying path Pt1 to perform a side-stitching operation to a bundle of sheets. The third conveying path Pt3 is connected to the second conveying path Pt2 to perform a saddle-stitched center-folded sheet bundling operation to the bundle of sheets.

The first conveying path Pt1, the second conveying path Pt2, and the third conveying path Pt3 are defined by guide members, for example.

The first conveying path Pt1 includes an entrance roller 11, a sheet conveying roller 12, a sheet conveying roller 13, and a sheet discharging roller 14, which are disposed in this order along the first conveying path Pt1 from an upstream side to a downstream side of the sheet conveying direction.

The entrance roller 11, the sheet conveying roller 12, the sheet conveying roller 13, and the sheet discharging roller 14 are driven by a motor that functions as a driving source to convey a sheet of paper (i.e., the sheet P).

The first conveying path Pt1 further includes an entrance sensor 15 disposed upstream from the entrance roller 11 in the sheet conveying direction. The entrance sensor 15 detects that the sheet P is conveyed into the sheet finishing apparatus 3.

A switching claw 17 is disposed downstream from the sheet conveying roller 12 in the sheet conveying direction. The switching claw 17 switches the position by pivoting to selectively guide the sheet P to one of a downstream side of the switching claw 17 in the first conveying path Pt1 in the sheet conveying direction and the second conveying path Pt2. The switching claw 17 is driven by a motor or a solenoid.

In a sheet discharging mode, the sheet P conveyed from the image forming apparatus 2 to the first conveying path Pt1 is conveyed by the entrance roller 11, the sheet conveying roller 12, the sheet conveying roller 13, and the sheet discharging roller 14 and is discharged to the first sheet discharging tray 10.

By contrast, in a side stitching mode and a center folding mode, the sheet P entered into the first conveying path Pt1 is conveyed by the entrance roller 11 and the sheet conveying roller 12, has a course of direction changed by the switching claw 17, and is conveyed to the second conveying path Pt2.

The second conveying path Pt2 includes sheet conveying rollers 20, 21, and 22, a sheet tray 23, a first sheet aligning part 24, and a side-stitching unit (a first stitching unit) 25.

The sheet conveying rollers 20, 21, and 22 are driven by a motor to convey the sheet P. The first sheet aligning part 24 is driven by the motor.

Switching claws 26 and 27 are disposed at a downstream side of the sheet tray 23 in the sheet conveying direction. The switching claws 26 and 27 pivot to switch respective positions, so that the sheet P is selectively guided to one of the downstream side of the switching claw 17 in the first conveying path Pt in the first conveying path Pt1 and the third conveying path Pt3. The switching claws 26 and 27 are driven by a motor or a solenoid, for example.

In the side stitching mode, multiple sheets P are sequentially loaded on the sheet tray 23. By so doing, the bundle of sheets including the multiple sheets P loaded thereon is formed. At this time, the trailing end of the bundle of sheets contacts a first movable reference fence that is disposed on the sheet tray 23 to align a position of the bundle of sheets in the sheet conveying direction and a width position of the bundle of sheets by the first sheet aligning part 24.

The sheet tray 23, the first sheet aligning part 24, and the first movable reference fence form a first bundling part 28 that functions as a bundling part to make multiple sheets into a stacked sheet bundle. The first bundling part 28 further includes a motor to drive the first sheet aligning part 24 and a motor to drive the first movable reference fence.

The side-stitched bundle of sheets is conveyed by the first movable reference fence to the first conveying path Pt1. Then, the bundle of sheets is further conveyed by the sheet conveying roller 13 and the sheet discharging roller 14 to be discharged to the first sheet discharging tray 10.

Here, the sheet discharging roller 14 functions as a sheet discharging member to discharge the bundle of sheets that is bundled by the side stitching unit 25. By contrast, in the center folding mode, the sheet P conveyed to the second conveying path Pt2 is conveyed to the third conveying path Pt3 by the sheet conveying rollers 20, 21, and 22, and the first movable reference fence.

The third conveying path Pt3 includes sheet conveying rollers 31 and 32 and a binding and folding part 33.

A motor drives the sheet conveying rollers 31 and 32 to convey the sheet P. The binding and folding part 33 includes a center folding part 34, a saddle stitching part (a second stitching unit) 35, and a second bundling part 36.

The sheet P conveyed to the third conveying path Pt3 is conveyed by the sheet conveying rollers 31 and 32 one by one to the second bundling part 36. As a result, a bundle of layered multiple sheets P is made. Specifically, the second bundling part 36 makes a stacked sheet bundle with multiple sheets conveyed by a sheet conveying part 51 that includes the entrance roller 11 and the sheet conveying rollers 12, 20, 21, 22, 31, and 32.

At this time, the leading end of the bundle of sheets including the sheets P contacts a second movable reference fence 37 to be aligned in the sheet conveying direction and contacts a second sheet aligning part to be aligned in a sheet width direction.

The saddle stitching part 35 stitches the bundle of sheets at or in the vicinity of the center of the bundle of sheets in the sheet conveying direction. The center-stitched bundle of sheets is returned to a center folding position by the second movable reference fence 37. The second movable reference fence 37 is driven by a motor.

The center folding part 34 folds the bundle of sheets at the center thereof in the sheet conveying direction. In the center folding part 34, a folding blade 38 is disposed to face the center of the bundle of sheets at the center folding position in the sheet conveying direction. The folding blade 38 that is driven by a motor moves from right to left of FIG. 1 to fold the center of the bundle of sheets in the sheet conveying direction to insert the bundle of sheets between a lower pressure roller 39 and an upper pressure roller 40. The folding blade is driven by a motor.

The folded bundle of sheets is vertically pressed by the lower pressure roller 39 and the upper pressure roller 40. The lower pressure roller 39 and the upper pressure roller 40 are driven by a motor.

The above-described center-folded bundle of sheets is discharged by the lower pressure roller 39, the upper pressure roller 40, and a sheet discharging roller 41 to a second sheet discharging tray 42.

As illustrated in FIGS. 1 and 2, the information detector 100 according to this example is connected with the image forming apparatus 2 by a communication cable 60 that functions as a communicator. According to this configuration, the information detector 100 and the image forming apparatus 2 can communicate with each other.

Figure 4A:
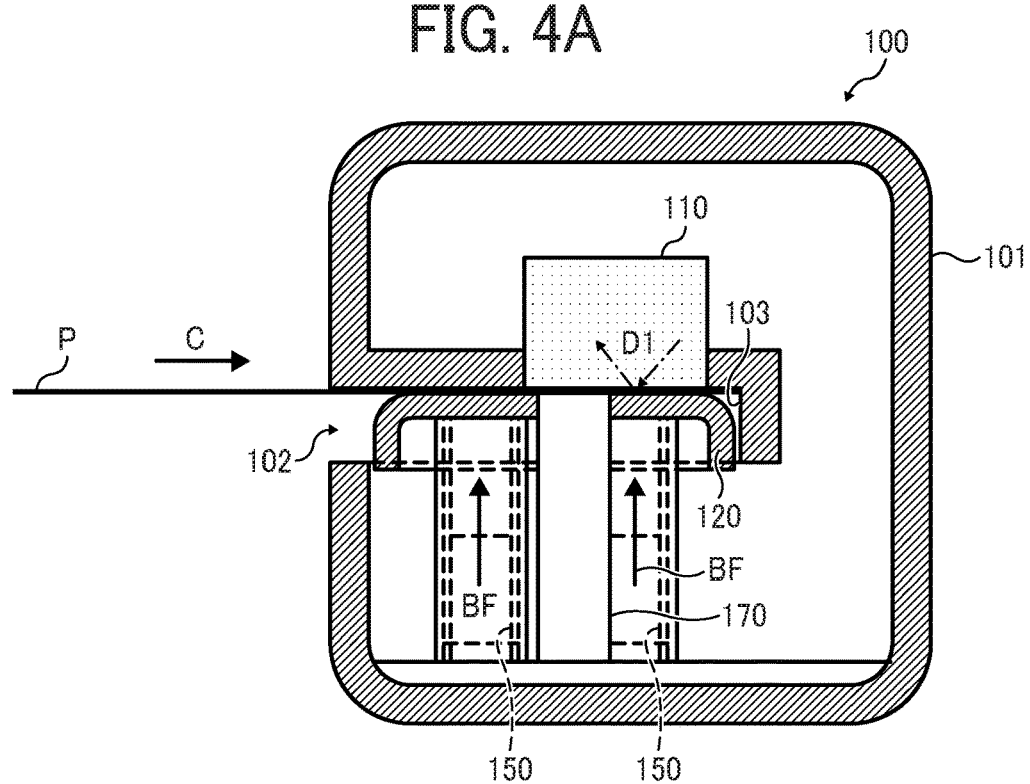
FIG. 4A is a cross sectional view illustrating an information detector when a sheet is inserted thereto through an opening.
Figure 4B:
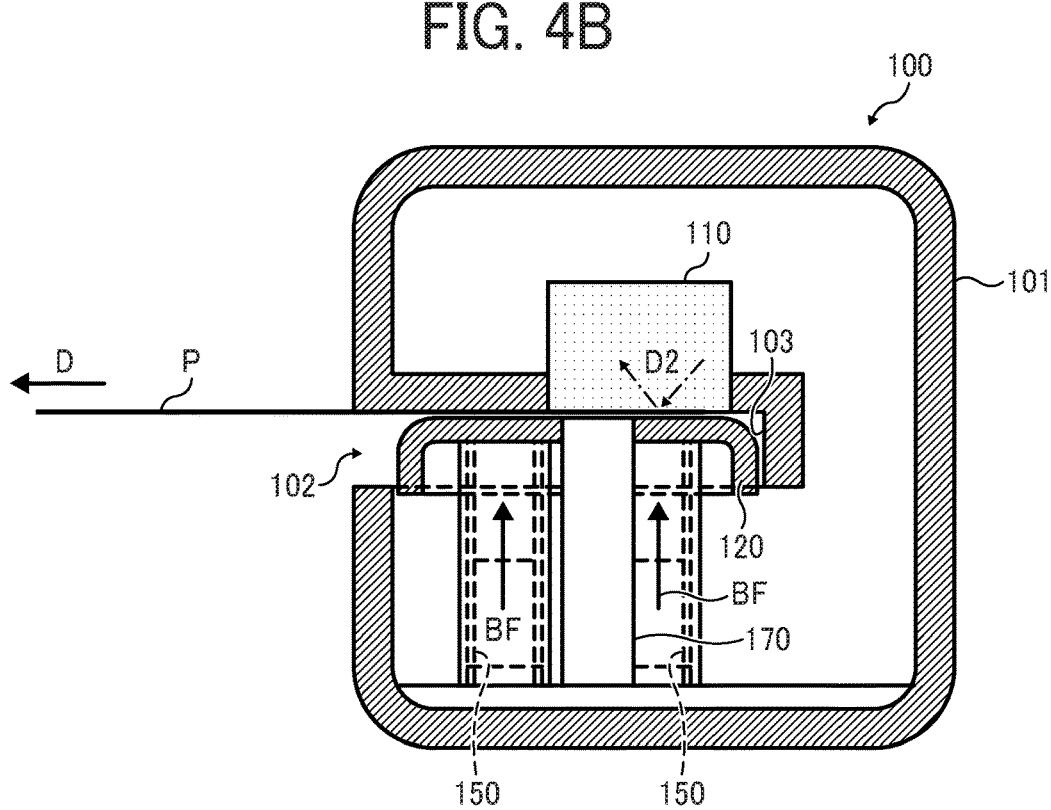
FIG. 4B is a cross sectional view illustrating the information detector when the sheet is pulled out from the opening of the information detector.

FIGS. 4A and 4B are cross sectional views of the information detector 100. Specifically, FIG. 4A is a cross sectional view illustrating the information detector 100 when the sheet P is inserted toward an end face 103 through the opening 102 of the information detector 100 in a direction indicated by arrow C and FIG. 4B is a cross sectional view illustrating the information detector 100 when the sheet P is pulled out from a position near the end face 103 of the opening 102 of the information detector 100 in a direction indicated by arrow D.

It is to be noted that respective sensors such as an information detecting sensor 110 and a thickness detecting sensor 170 are drawn in a simplified way in FIGS. 4A and 4B.

The information detecting sensor 110 is disposed at an upper part of an inside of the external case 101 of the information detector 100. The information detecting sensor 110 performs an information detection D1 as illustrated in FIG. 4A and another information detection D2 as illustrated in FIG. 4B.

The sheet loading table 120 and the thickness detecting sensor 170 are disposed at a lower art of the inside of the external case 101 of the information detector 100.

The sheet loading table 120 is disposed facing the information detecting sensor 110 across a gap therebetween. The thickness detecting sensor 170 is disposed upstream from an information detectable position of the information detecting sensor 110.

With this configuration, when the sheet P is inserted through the opening 102 to the information detectable position so that the information detecting sensor 110 can detect information on the sheet P, the thickness detecting sensor 170 can detect the thickness of the sheet P reliably. Accordingly, the thickness detecting sensor 170 can detect the thickness of the sheet P more accurately, and accuracy in discrimination of sheets can be more enhanced.

It is to be noted that, even though the thickness detecting sensor 170 is disposed at the above-described position, the position to set the thickness detecting sensor 170 is not limited thereto. For example, the thickness detecting sensor 170 can be disposed in an upper part inside the external case 101 of the information detector 100 and horizontally aligned with the information detecting sensor 110. The thickness detecting sensor 170 can be disposed at any position where the thickness detecting sensor 170 can detect the thickness of the sheet P that is inserted into the information detector 100 through the opening 102.

Further, biasing members 150 such as springs are disposed facing the information detecting sensor 110 with the sheet loading table 120 interposed therebetween. The sheet loading table 120 is biased by the biasing members 150 in a direction indicated by arrows BF in FIGS. 4A and 4B, that is, toward the information detecting sensor 110.

As illustrated in FIG. 5, the information detecting sensor 110 includes a light source 111, a collimator lens 112, receivers 113, 114, 115, 118, and 160, polarizing filters 116 and 117, and dark boxes (camera obscuras) 119A and 119B to accommodate these optical units therein.

Each of the dark boxes 119A and 119B is a metal box such as an aluminum box, and anodic oxide coating with black dye on a surface thereof in order to reduce the impact of ambient light and stray light.

Figure 6:
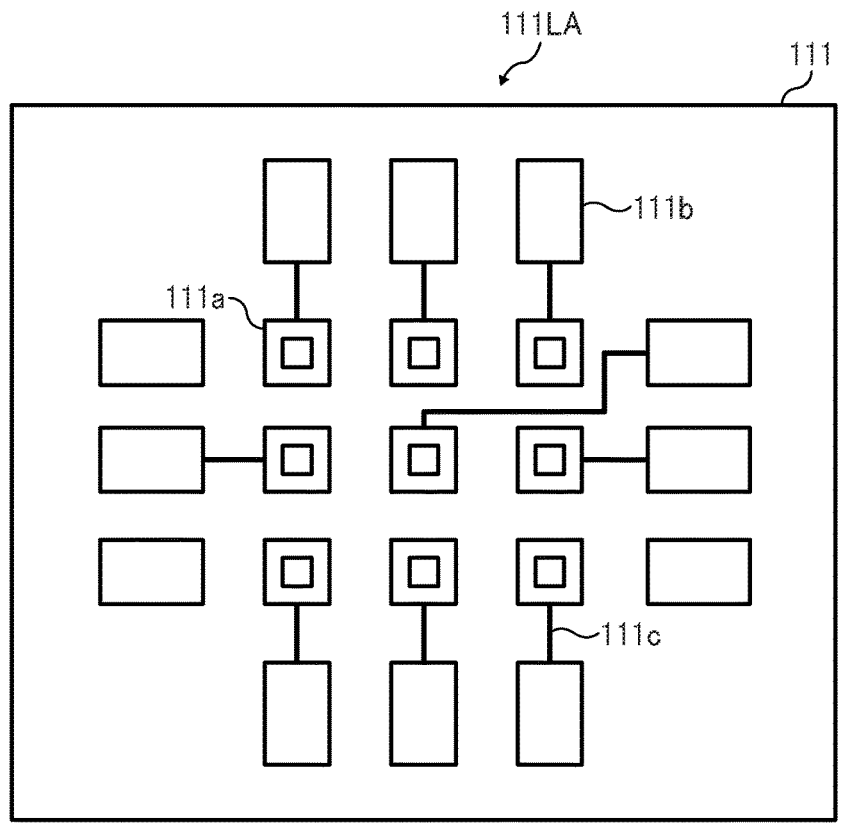
FIG. 6 is a diagram illustrating a structure of a vertical cavity surface emitting laser array (a VCSEL array)

The light source 111 functions as a light emitter and includes multiple light emitting elements 111a, which are vertical cavity surface emitting lasers (VCSELs). Specifically, the light source 111 includes a VCSEL array 111LA. As illustrated in FIG. 6, the light source 111 of the information detecting sensor 110 includes a two dimensional array with nine (9) light emitting elements 111a. The VCSEL array 111LA includes electrode pads 111b and wiring members 111c. Each wiring member 111c connects one of the multiple light emitting elements 111a with a corresponding one of the electrode pads 111b.

Figure 7:
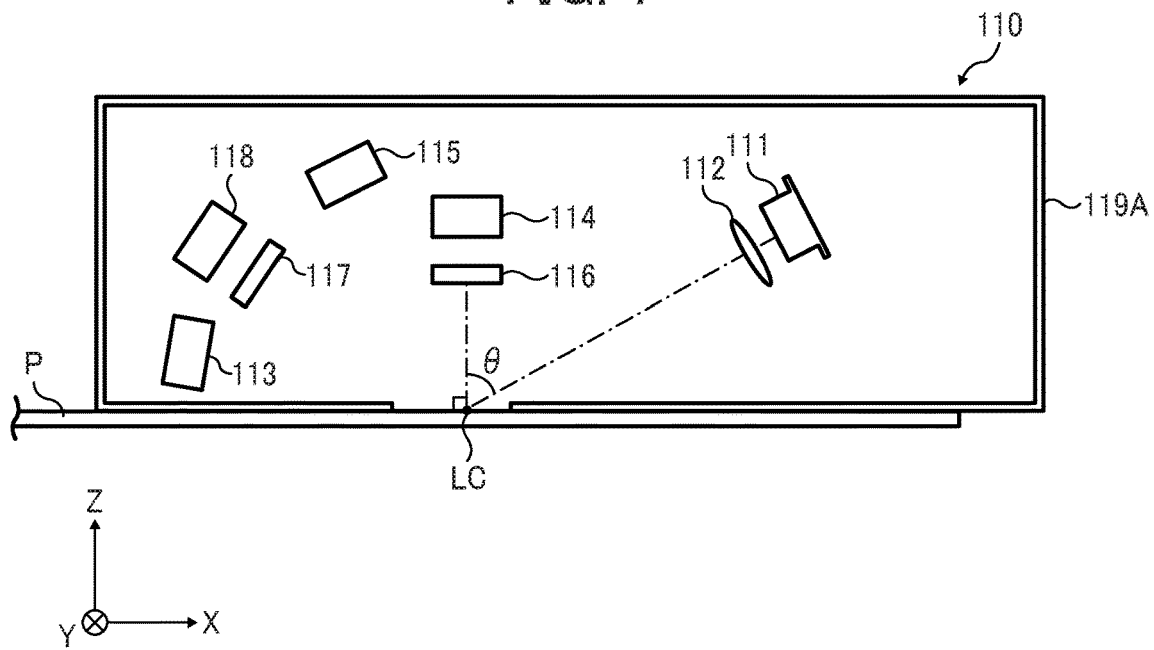
FIG. 7 is a diagram illustrating an incident angle of an irradiation light to the sheet.

The light source 111 is disposed such that linearly polarized light of S-polarized light to the sheet P is emitted. As illustrated in FIG. 7, an incidence angle θ of light from the light source 111 to the sheet P is 80 degrees. The light emission processing unit 130 turns on/off the light source 111.

The collimator lens 112 is disposed on a light path of light emitted from the light source 111 to make the light substantially parallel, which is hereinafter referred to as a substantially parallel light. The substantially parallel light passes through the collimator lens 112 then through an opening provided on the dark box 119A, and emits the light to the sheet P. It is to be noted that a center of a light emission region on a surface of the sheet P is hereinafter referred to as a "center of light emission (LC)" and the light passed through the collimator lens 112 is also referred to as an "irradiation light".

When the light enters onto a border surface of a medium, a surface that contains an incident light (an incoming radiation) and a normal line of a border surface standing at a light incident point is called as a "plain of incidence of light". When the incident light includes multiple light beams, each light beam has the plane of incidence of light. Here, for convenience, the plane of incidence of light incoming to the center of light emission is referred to as a "plane of incidence of the sheet P". Specifically, the plane of incidence of the sheet P contains the center of light emission (LC) and is parallel to X and Z surfaces of the sheet P.

It is to be noted that terms "S-polarized light" and "P-polarized light" are used for not only the incident light to the sheet P but also a reflection light on the sheet P based on a polarization direction of the incident light to the sheet P for easy understanding of this technique. On the plane of incidence, a polarization direction identical to the incident light is referred to as "S-polarized light" and a polarization direction perpendicular to the incident light is referred to as "P-polarized light". In this example, the incident light is an S-polarized light.

The polarizing filter 116 is disposed on a +Z side of the center of light emission. The polarizing filter 116 is a polarizing filter that transmits the P-polarized light and blocks or reflects the S-polarized light. It is to be noted that a polarizing beam splitter that has the same functions as the polarizing filter 116 can be employed instead of the polarizing filter 116.

Figure 8:
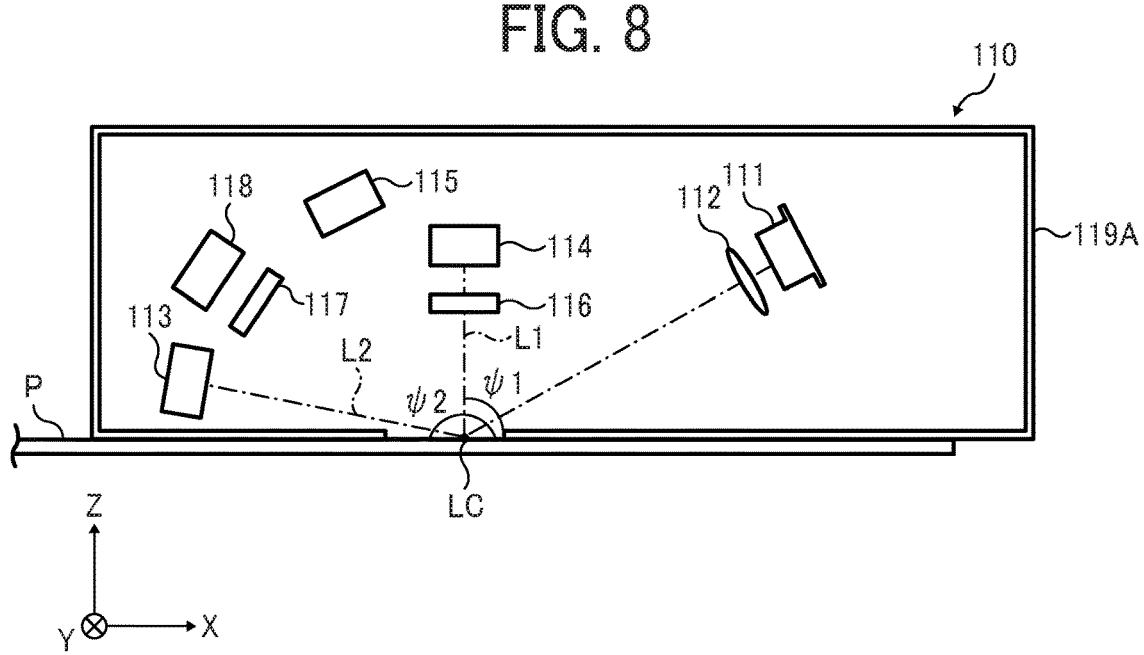
FIG. 8 is a diagram illustrating respective positions of receivers.

The receiver 114 is disposed on the +Z side of the polarizing filter 116 and functions as a light receiver to receive the light transmitted through the polarizing filter 116. As illustrated in FIG. 8, a line L1 connects the center of light emission, a center of the polarizing filter 116, and a center of the receiver 114. The line L1 and the surface of the sheet P form an angle ψ1 of 90 degrees.

The receiver 113 is disposed on the +X side of the center of light emission with respect to an X axis. As illustrated in FIG. 8, a line L2 connects the center of light emission and a center of the receiver 113. The line L2 and the surface of the sheet P form an angle ψ2 of 170 degrees.

A center of the light source 111, the center of light emission, the center of the polarizing filter 116, and respective centers of the receivers 113, 114, 115, and 118 fall on the substantially identical vertical plane.

The reflection light reflected on the sheet P when the sheet P is irradiated can be separated to reflection light reflected on the surface of the sheet P and reflection light reflected from an inside of the sheet P. Further, the reflection light reflected on the surface of the sheet P can be separated to specular reflection light (SRL) and diffused reflection light (DRL).

Figure 9A:
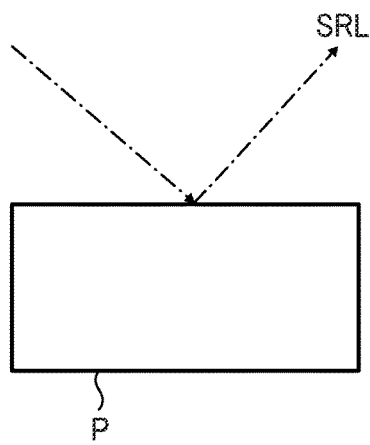
FIG. 9A is a diagram illustrating a surface specular reflection light.
Figure 9B:
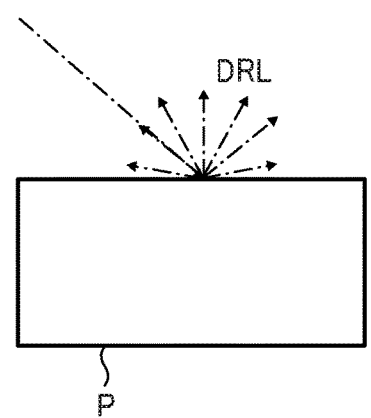
FIG. 9B is a diagram illustrating a surface diffused reflection light.

For convenience, the specular reflection light reflected on the surface of the sheet P is hereinafter referred to as a "surface specular reflection light (SRL)" (see FIG. 9A) and the diffused reflection light reflected on the surface of the sheet P is hereinafter referred to as a "surface diffused reflection light (DRL)" (see FIG. 9B).

The surface of the sheet P includes plane portions and sloped portions. Based on a rate of the plane portions and the sloped portions, smoothness of the surface of the sheet P is determined. The light reflected on the plane portions becomes the surface specular reflection light and the light reflected on the sloped portions becomes the surface diffused reflection light. The surface diffused reflection light is the light fully reflected from an object (i.e., the sheet P) and a reflection direction has isotropy. As smoothness increases, the level of the surface specular reflection light rises.

Figure 9C:
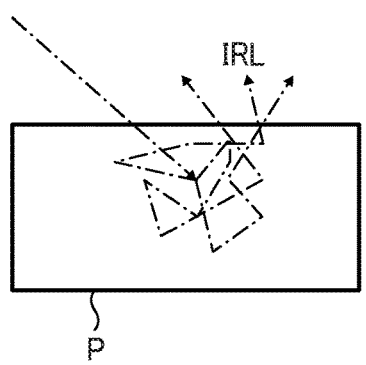
FIG. 9C is a diagram illustrating an internal reflection light.

By contrast, when the sheet P is a regular printing sheet, the reflection light reflected from the inside of the sheet P scatters in the fibers of the sheet P. Therefore, the reflection light is the diffused reflection light because the light scatters multiply in the sheet P. Hereinafter, for convenience, the reflection light reflected from the inside of the sheet P is also referred to as an "internal reflection light (IRL)" (see FIG. 9C). Similar to the surface diffused reflection light, the internal reflection light is the light fully reflected from an object (i.e., the sheet P) and the reflection direction is isotropic.

The polarization directions of the surface specular reflection light and the surface diffused reflection light toward the receiver (i.e., the receiver 114) are the same as the polarization direction of the incident light.

In order to rotate the polarization direction on the surface of the sheet S, the incident light is reflected on the sloped surface that is slanted to the rotation of the polarization direction with respect to an incident direction. Here, since the center of the light source (i.e., the light source 111), the center of light emission, and the center of each receiver (i.e., the receivers 113 and 114) fall on the same plane, the reflection light in the polarization direction rotated on the surface of the sheet P is not reflected in any direction of the receiver.

By contrast, the polarization direction of the internal reflection light is rotated with respect to the polarization direction of the incident light. It is thought that the polarization direction of the internal reflection light is thus rotated because the light entered into the inside of the sheet (i.e., the sheet P) passes through the fibers of the sheet and optically rotates during multiple scattering in the sheet, thereby rotates the polarization direction.

Figure 10:
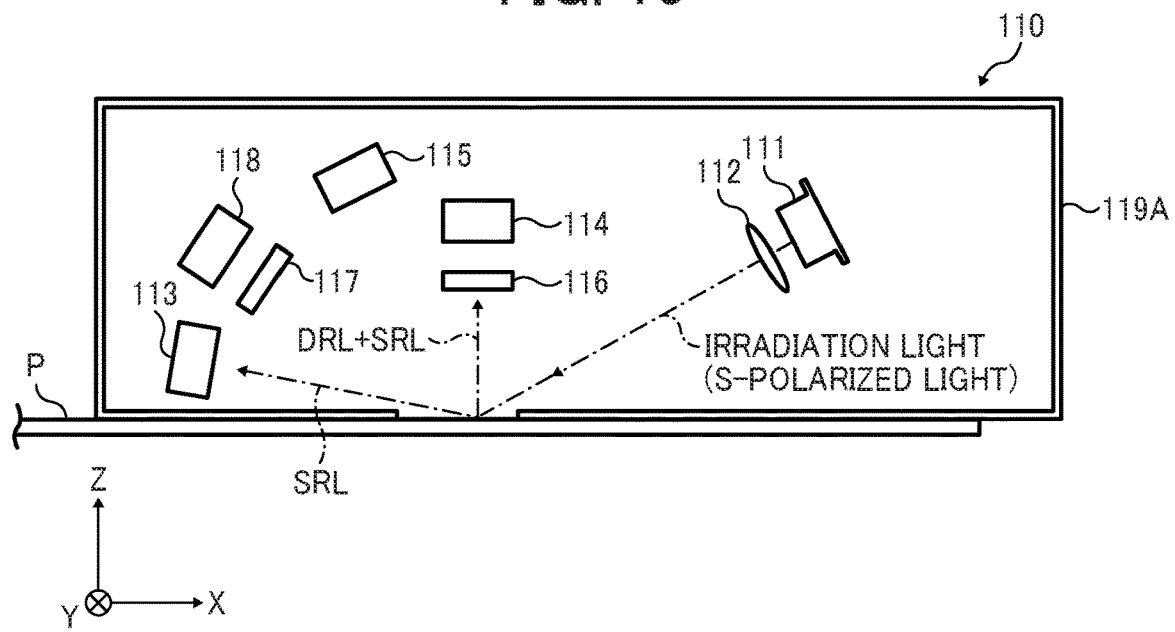
FIG. 10 is a diagram illustrating the light received by receivers.

The reflection light including the surface diffused reflection light and the internal reflection light enters into the polarizing filter 116, as illustrated in FIG. 10.

Figure 11:
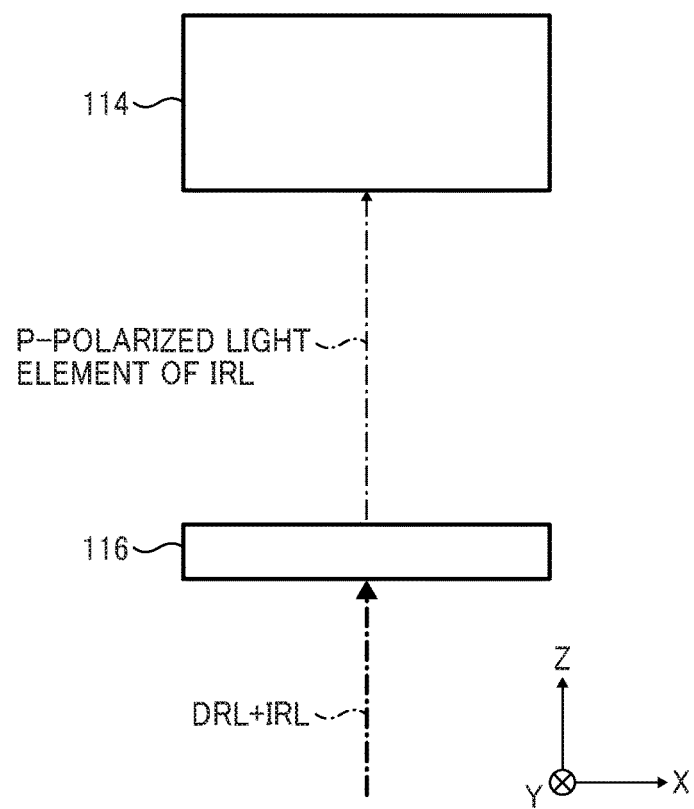
FIG. 11 is a diagram illustrating an incident light to a diffusion filter.

Since the surface diffused reflection light is the S-polarized light that is the same as the incident light. Therefore, the polarizing filter 116 blocks or reflects the surface diffused reflection light. By contrast, the internal reflection light includes both the S-polarized light and the P-polarized light. Therefore, a component of the P-polarized light passes through the polarizing filter 116. Specifically, the component of the P-polarized light contained in the internal reflection light is received by the receiver 114 (see FIG. 11).

It is to be noted that the component of the P-polarized light included in the internal reflection light is also referred to as a "P-polarized light internal reflection light", for convenience. In addition, a component of the S-polarized light included in the internal reflection light is also referred to as an "S-polarized light internal reflection light".

The level of the P-polarized light internal reflection light is proved to have a correlation to thickness and density of the sheet P. It is because the level of the P-polarized light internal reflection light depends on a path length when the P-polarized light internal reflection light passes through the fibers in the sheet P.

The receiver 113 receives reflection light having the surface specular reflection light, the surface diffused reflection light, and the internal reflection light. At this light receiving position, the level of the surface diffused reflection light and the level of the internal reflection light are significantly smaller than the level of the surface specular reflection light. Therefore, it is regarded as that the level of light received by the receiver 113 substantially corresponds to the level of the surface specular reflection light (see FIG. 10).

Figure 12:
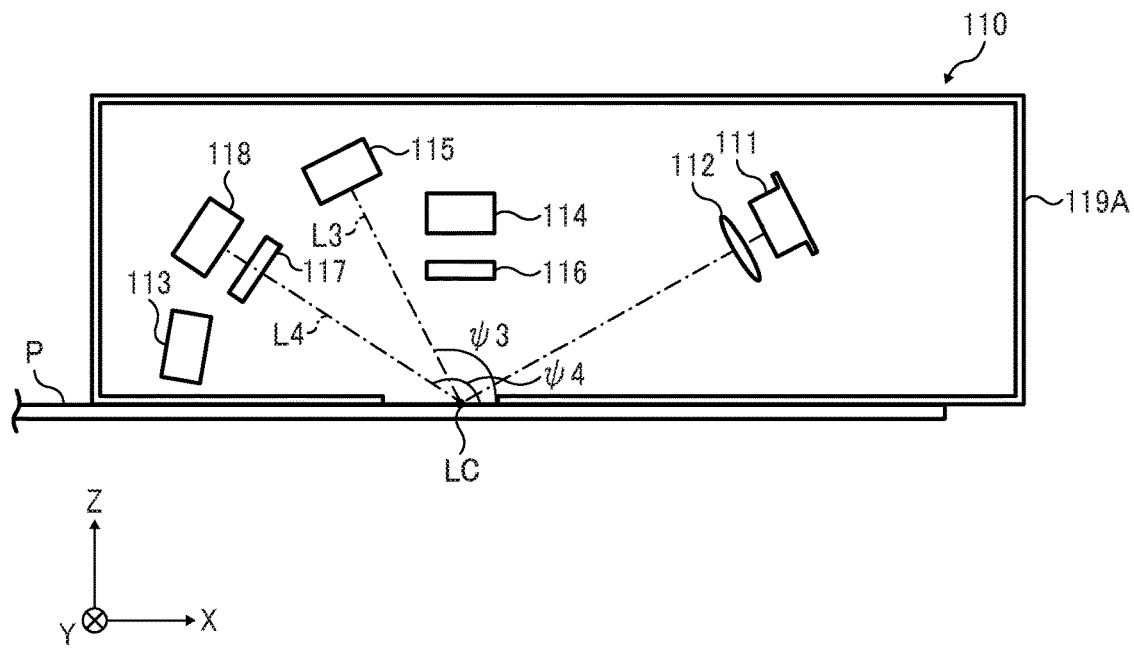
FIG. 12 is a diagram illustrating respective positions of different receivers.

The receiver 115 that functions as a light receiver is disposed at a position to receive the surface diffused reflection light and the internal reflection light. For example, as illustrated in FIG. 12, a line L3 connects the center of light emission and a center of the receiver 115. The line L3 and the surface of the sheet P form an angle ψ3 of 120 degrees. The center of the light source 111, the center of light emission, the center of the polarizing filter 116, and the respective centers of the receivers 113, 114, 115, and 118 fall on the substantially same vertical plane.

The polarizing filter 117 is disposed on the light path of the surface diffused reflection light and the internal reflection light. The polarizing filter 117 is a polarizing filter that transmits the P-polarized light and blocks or reflects the S-polarized light.

The receiver 118 is disposed on a light path of the light that has transmitted through the polarizing filter 117. The receiver 118 receives a component of the P-polarized light included in the internal reflection light.

For example, as illustrated in FIG. 12, a line L4 connects the center of light emission, a center of the polarizing filter 117, and a center of the receiver 118. The line L4 and the surface of the sheet P form an angle ψ4 of 150 degrees. The center of the light source 111, the center of light emission, the center of the polarizing filter 116, the center of the polarizing filter 117, and the respective centers of the receivers 113, 114, 115, and 118 fall on the substantially same vertical plane.

The receiver 160 illustrated in FIG. 5 functions as a transmitted light receiver and is disposed at a position to receive a light beam that transmits through the sheet P out of the light beams emitted from the light source 111 and irradiated to the sheet P.

The receivers 113, 114, 115, 118, and 160 output respective electrical signals (current signals) corresponding to respective received light levels to the light emission processing unit 130.

As illustrated in FIG. 5, the light emission processing unit 130 includes a light source driver 131, a current-to-voltage converter 132, and an analog-to-digital (AD) converter 133. The light emission processing unit 130 is connected to the dark box 119A.

The light source driver 131 outputs the light source driving signal to the light source 111 according to instructions issued by a controller 600.

The current-to-voltage converter 132 convers current signals inputted by each receiver to voltage signals.

The AD converter 133 converts analog signals passing through the current-to-voltage converter 132 to digital signals and outputs the converted digital signals to the controller 600.

As described in this example, by including information obtained by the receiver 160 that receives a transmitted light in addition to information obtained by the receivers 113, 114, 115, and 118 receiving the reflection light, the information detector 100 can discriminate the type of the sheet P more precisely.

A thickness of the sheet P can be obtained as information of the sheet P based on the levels of transmitted light received by the receiver 160. When the sheet P is not inserted into the information detector 100 through the opening 102 and is not located between the light source 111 and the receiver 160, the receiver 160 receives a constant amount of light emitted from the light source 111.

When the sheet P is inserted into the opening 102 and is located between the light source 111 and the receiver 160, the level of light received by the receiver 160 varies according to the thickness of the sheet P. Based on the level of the received light, the controller 600 can obtain the thickness of the sheet P with transform expressions and conversion tables, both of which are previously prepared to convert the light level to an amount of thickness of the sheet P.

By contrast, as described above, the information detector 100 according to this example includes the thickness detecting sensor 170 to detect the thickness of the sheet P that is inserted into the opening 102 is provided, separately from the information detecting sensor 110.

Figure 13:
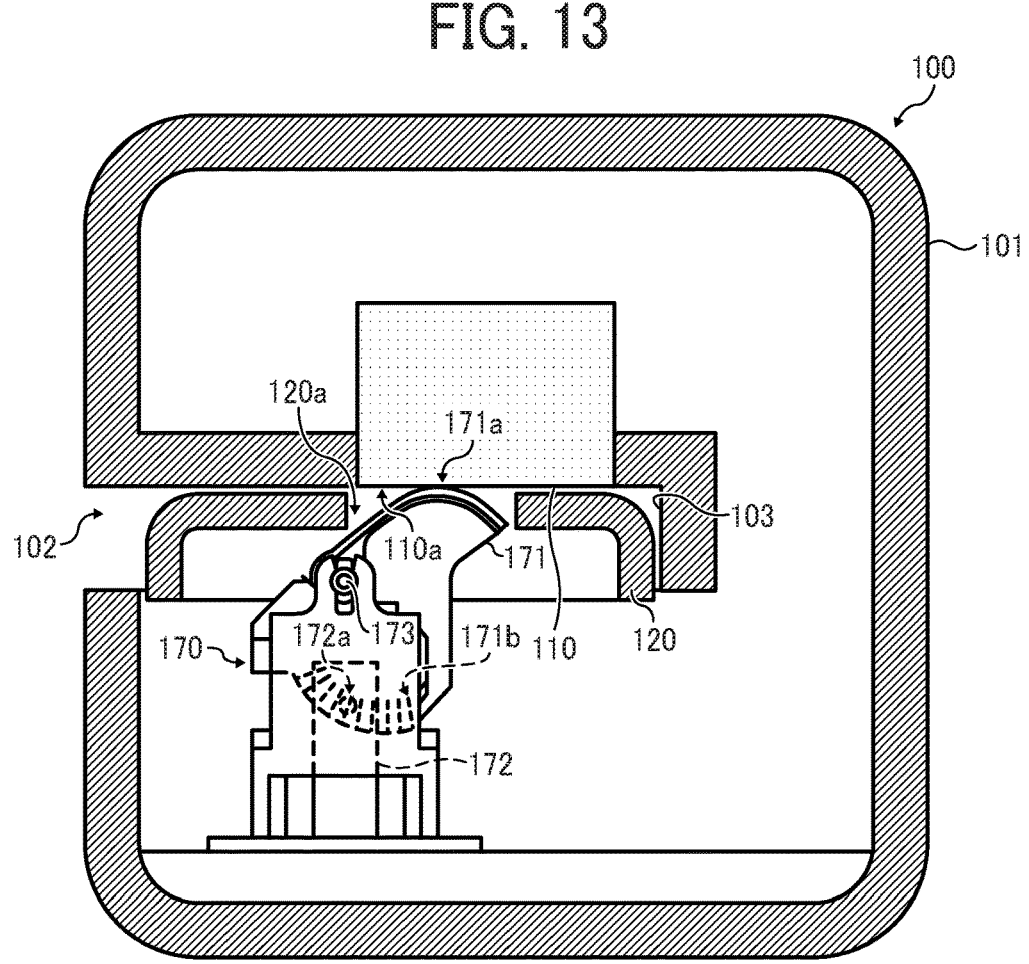
FIG. 13 is a cross sectional view illustrating a configuration of the information detector, sectioned along a line corresponding to a length of a slit formed on a sheet loading table.

FIG. 13 is a cross sectional view illustrating a configuration of the information detector 100, sectioned along a line corresponding to a length of a slit 120*a* formed on the sheet loading table 120.

It is to be noted that the biasing members 150 to bias the sheet loading table 120 as illustrated in FIGS. 4A and 4B are omitted in FIG. 13.

The thickness detecting sensor 170 is an encoder that functions as a displacement detector to detect an amount of displacement according to the thickness of the sheet P. As illustrated in FIG. 13, the thickness detecting sensor 170 includes a feeler 171 and a transmission type optical sensor 172.

The feeler 171 that functions as a displacement gauge has multiple slits 171*b* formed at constant angled pitches.

The transmission type optical sensor 172 that functions as a displacement detector detects the multiple slits 171*b* of the feeler 171.

Figure 14:
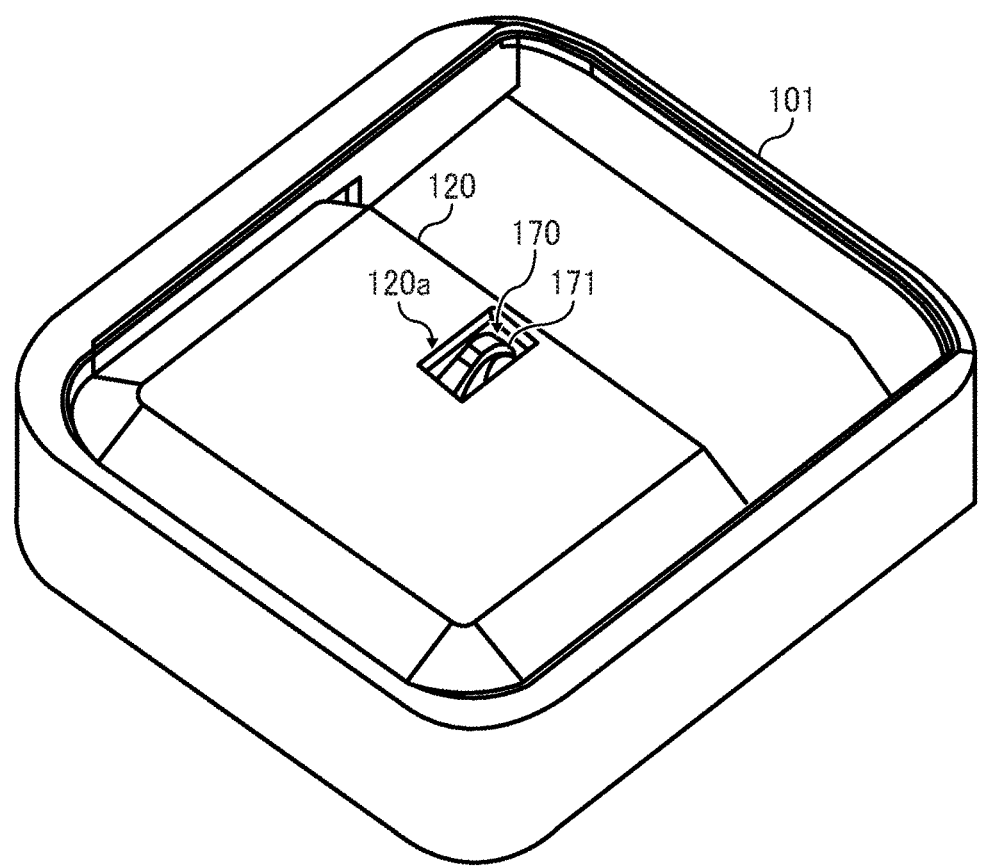
FIG. 14 is a perspective view illustrating a lower part of the information detector with an upper part of a feeler exposed from the slit formed on the sheet loading table.

FIG. 14 is a perspective view illustrating a lower part of the information detector 100.

As illustrated in FIG. 14, an upper part of the feeler 171 of the thickness detecting sensor 170 is exposed from the slit 120*a* formed on the sheet loading table 120 so that the upper part of the feeler 171 is located on a path of insertion of the sheet P in the gap formed between the sheet loading table 120 and the information detecting sensor 110.

When the sheet P is not inserted in the opening 102, the feeler 171 is located at an initial position at which an upper end 171*a* of the feeler 171 is in contact with a bottom face 110*a* of the information detecting sensor 110, which functions as an opposing member. When the feeler 171 is at the initial position, the sheet P is not sandwiched by the feeler 171 and the information detecting sensor 110, and therefore the thickness detecting sensor 170 detects the thickness of the sheet P as "0".

Figure 15A:
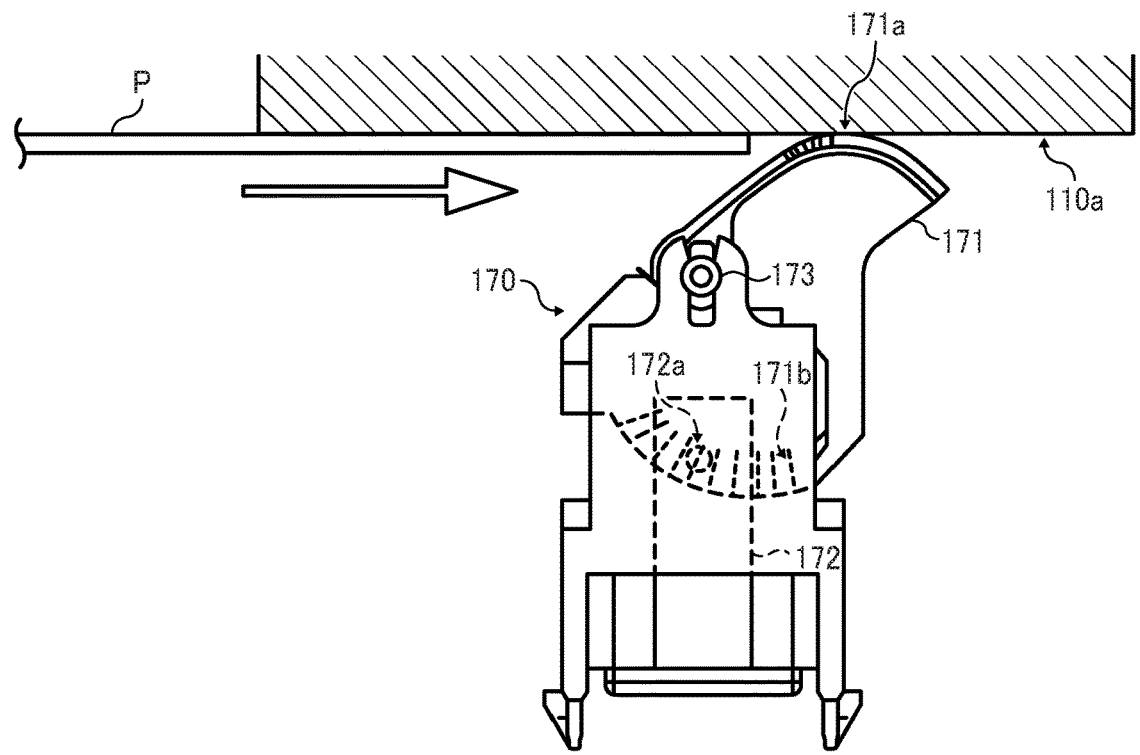
FIG. 15A is a diagram illustrating a state immediately before a sheet passes a contact position of an upper end of the feeler and a bottom face of a sheet information detecting sensor.
Figure 15B:
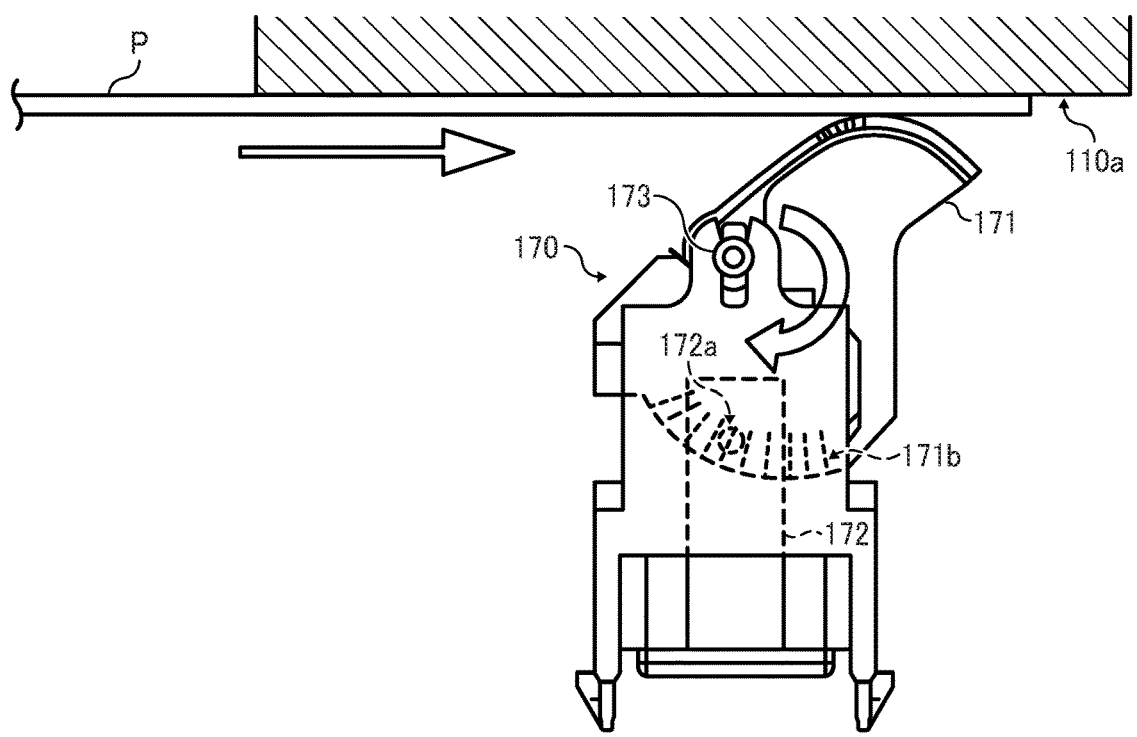
FIG. 15B is a diagram illustrating a state in which the sheet is passing the contact part of FIG. 15A.

FIG. 15A is a diagram illustrating a state immediately before the sheet P passes a contact position of the upper end 171*a* of the feeler 171 and the bottom face 110*a* of the information detecting sensor 110. FIG. 15B is a diagram illustrating a state in which the sheet P is passing the contact part of FIG. 15A.

As illustrated in FIG. 15A, when the sheet P is inserted into the opening 102 to pass the contact position where the upper end 171*a* of the feeler 171 and the bottom face 110*a* of the information detecting sensor 110, the sheet P presses the feeler 171. Consequently, as illustrated in FIG. 15B, the feeler 171 rotates about a rotary shaft 173 thereof in a clockwise direction in FIG. 15B. Accordingly, the sheet P is sandwiched between the feeler 171 and the information detecting sensor 110.

At this time, the optical sensor 172 detects the multiple slits 171*b* passing a position facing a sensor part 172*a* thereof. By so doing, a rotation amount of the feeler 171 is obtained based on detection results of the optical sensor 172. The thus obtained rotation amount of the feeler 171 is then converted to an amount of thickness of the sheet P by a given expression or equation. Accordingly, the thickness of the sheet P can be obtained.

It is to be noted that the configuration of the thickness detecting sensor 170 is not limited to the above-described configuration. For example, any configuration including a displacement sensor that can detect the thickness of the sheet P can be applied to this disclosure.

However, even the same types of sheets such as plain papers may have different surface conditions of the sheets based on brands thereof. Due to this reason, even if the image forming conditions are set according to general types of sheets such as plain papers as information on a sheet associated with information on the features of the sheet, an image cannot be formed under optimum image forming conditions applied to the sheet used for image formation.

Figure 16:
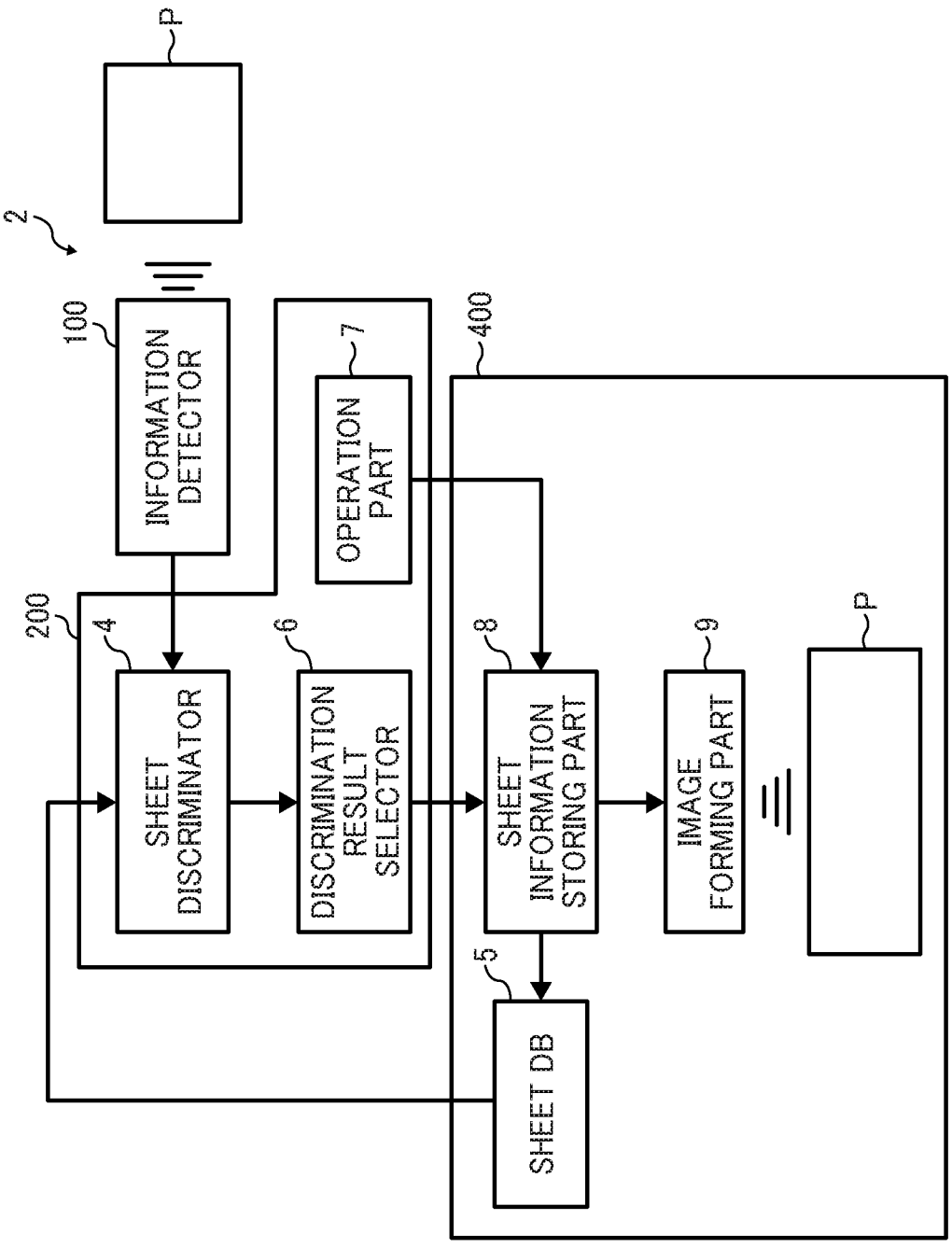
FIG. 16 is a block diagram illustrating of an image forming apparatus.

FIG. 16 is a block diagram illustrating of the image forming apparatus 2 for explaining a schematic configuration of the image forming apparatus 2.

The information detector 100 is connected to the control panel 200 of the image forming apparatus 2. Information on the features of the sheet P is detected by the information detector 100.

The control panel 200 is also connected to a sheet discriminator 4 and a discrimination result selector 6.

The sheet discriminator 4 can be communicated with the information detector 100, so that the information on the features of the sheet P detected by the information detector 100 is transmitted to the sheet discriminator 4.

The sheet discriminator 4 can also be communicated with a sheet DB 5. The sheet DB 5 is a database in which information on types of sheets is listed for each brand of the sheets. Example parameters of the types of sheets stored in the sheet DB 5 are information on the features of sheets detectable by the information detector 100, information identifying sheet such as brand name and type, adjustment values used for image formation, and so forth.

The sheet discriminator 4 discriminates the sheet P based on information on the features of the sheet P sent by the information detector 100. Specifically, the information on the features of the sheet P sent by the information detector 100 is matched with information on the features of the sheets stored in the sheet DB 5. After the matching, the sheet DB 5 stores information of a sheet having a brand that is close to the information on the features of the sheet P, the brand name is displayed on the discrimination result selector 6 as a result of discrimination of the sheet P.

It is to be noted that not only a single brand but also multiple brands can be discriminated. When the sheet discriminator 4 has found multiple brands stored in the sheet DB 5 applicable to the sheet P, the discrimination result selector 6 displays information on the features of the sheet P sent by the information detector 100 and information on the features of the sheets stored in the sheet DB 5 as the discrimination result with a precision ratio of each information.

The discrimination result selector 6 is operated by a user to select an appropriate brand when the sheet DB 5 contains multiple brands applicable to the sheet P. Upon selection of one brand by the user, information of the sheet P of the selected brand is sent to the apparatus body 400. The information of the sheet P sent to the apparatus body 400 is full information of the selected brand stored in the sheet DB 5. The information of the sheet P sent to the apparatus body 400 is forwarded to a sheet information storing part 8. The sheet information storing part 8 is designed to assign the information of the sheets to individually set the information for each of the first sheet tray 415a and the second sheet tray 415b in which the sheet P to be printed is accommodated.

An adjustment value for image formation that is set in the sheet information storing part 8 is sent to the image forming part 9 in which image forming conditions are adjusted based on the information.

The information on the sheet stored in the sheet information storing part 8 can be revised via an operation part 7 of the control panel 200. Further, the information on the sheet P stored in the sheet information storing part 8 can be added to the sheet DB 5, so that the information on the sheet P is written and stored in the sheet DB 5.

It is to be noted that, even though the image forming apparatus 2 according to the resent example employs separate memories, i.e., the sheet DB 5 and the sheet information storing part 8. However, the sheet DB 5 and the sheet information storing part 8 can function as a single memory. By so doing, the number of memories provided to the image forming apparatus 2 can be reduced, thereby contributing to space saving in the image forming apparatus 2 and cost reduction of the image forming apparatus 2.

By contrast, by providing the sheet DB 5 and the sheet information storing part 8 as separate memories, when abnormality occurs in information of sheets to be stored in the sheet DB 5 and/or the sheet information storing part 8, the information stored in either one of the sheet DB 5 and the sheet information storing part 8 can be restored, thereby enhancing information restoration.

Figure 17:
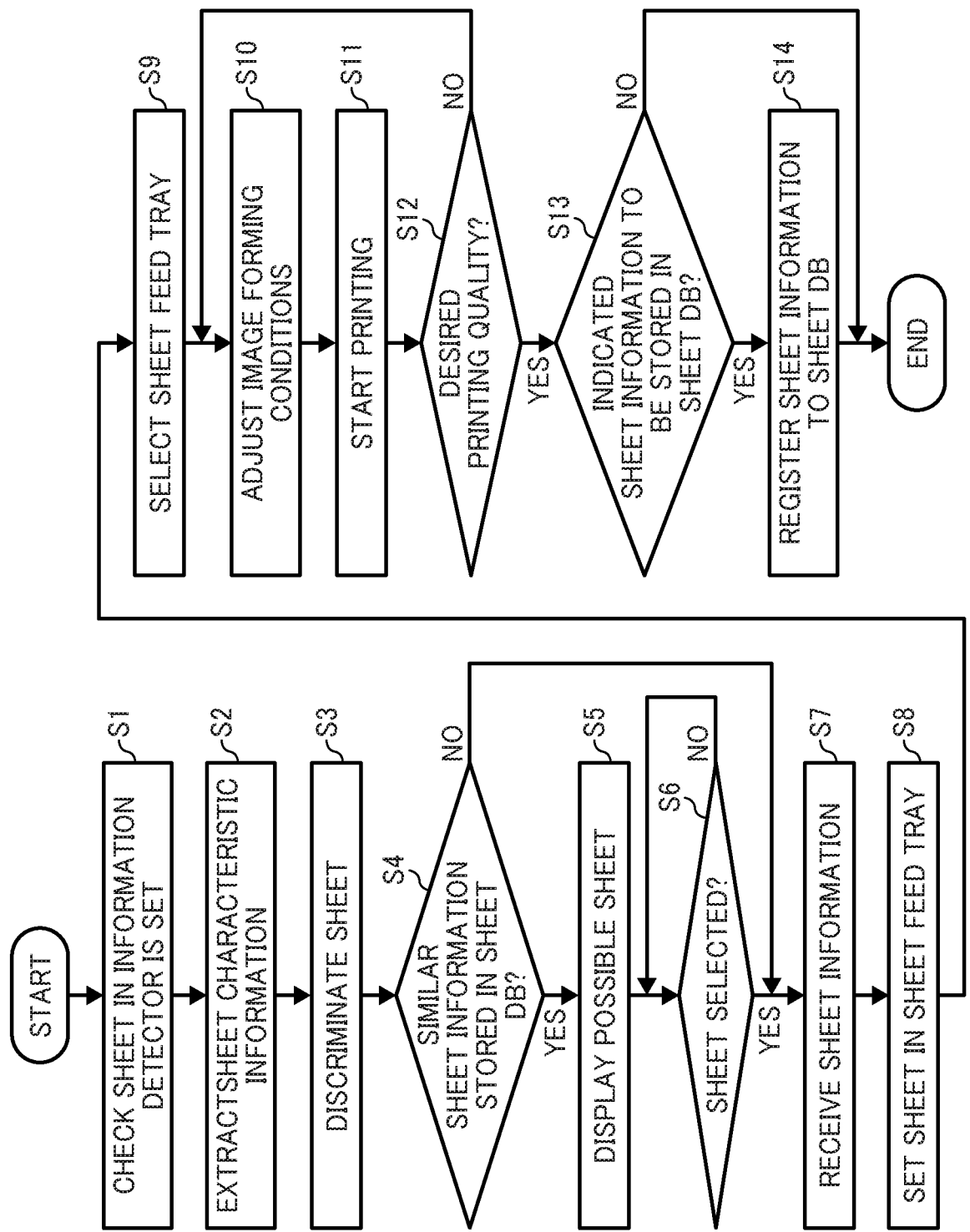
FIG. 17 is a flowchart illustrating an example of image forming processes of the image forming apparatus.

Now, a description is given of image forming processes performed by the image forming apparatus 2 with reference to FIG. 17.

FIG. 17 is a flowchart illustrating an example of a sequence of image forming processes of the image forming apparatus 2.

First, the controller 600 checks that the sheet P to be printed is set to the information detector 100 in step S1. Then, the information detector 100 detects information on the features of the set sheet P in step S2. The sheet discriminator 4 matches the information on the features of the sheet P thus detected by the information detector 100 with information of the sheets stored in the sheet DB 5 and determines similar information to discriminate the sheet P in step S3. Based on the discrimination result, the controller 600 determines whether or not similar information of sheets is stored in the sheet DB 5 in step S4.

When the similar information is stored in the sheet DB 5 and the brand of the sheet P is found (YES in step S4), the controller 600 displays at least one candidate sheet on the discrimination result selector 6 in step S5.

As described above, the result displayed on the discrimination result selector 6 is not limited to one candidate sheet. In other words, not only a single candidate sheet but also multiple candidate sheets are displayed as the result on the discrimination result selector 6.

When multiple candidate sheets are displayed, a user selects a corresponding brand based on the displayed result via the discrimination result selector 6 in step S6. Upon selection of the brand of the sheet P and determination of information of the sheet P, the controller 600 transmits the full information of the sheet P including the information on the features of the sheet P, information of discrimination, and information for image formation to the sheet information storing part 8. Then, the sheet information storing part 8 receives the information on the sheet P that has been discriminated by the sheet discriminator 4 in step S7.

After these processes are completed, image forming conditions are set to the image forming apparatus 2.

By contrast, when the similar information is not stored in the sheet DB 5 and the brand of the sheet P is not found (NO in step S4), the controller 600 displays on the control panel 200 that any candidate brand of the sheet P is not stored in the sheet DB 5, and then the information on the features of the sheet P detected by the information detector 100 is sent to the subsequent process. By displaying the message on the control panel 200, the user can know that no candidate brand of the sheet P is stored in the sheet DB 5. Further, since any candidate brand is not stored in the sheet DB 5, a preset (default) condition of the brand of the sheet P remains set in the image forming conditions.

The sheet P on which an image is to be formed is then set to one of the first sheet tray 415a and the second sheet tray 415b in step S8. Then, in step S9, the controller 600 assigns the information on the sheet P stored in the sheet information storing part 8 with respect to the selected one of the first sheet tray 415a and the second sheet tray 415b in which the sheet P is set. When the image is printed on the sheet P, the user selects via the control panel 200 one of the first sheet tray 415a and the second sheet tray 415b accommodating the sheet P to be printed. By so doing, the printing operation is performed under the image forming conditions corresponding to the sheet P that is set in the selected one of the first sheet tray 415a and the second sheet tray 415b. Therefore, when image formation can be performed effectively when using the same type of the sheet P accommodated in the same sheet tray, the image formation can be performed effectively without using the information detector 100 to detect the above-described information on the features of the sheet P.

Further, the controller 600 causes the operation part 7 of the control panel 200 to adjust the information on the sheet P stored in the sheet information storing part 8 in step S10. A candidate image forming condition for any brands of sheets not stored in the sheet DB 5 can be estimated based on known general information such as types of sheets.

Then, the printing operation is performed in step S11, and the controller 600 determines whether or not the printed image has the desired printing quality in step S12.

When the printed image has not met the printing quality that the user desires (NO in step S12), the controller 600 adjusts the image forming conditions in step S10 and performs the printing operation again in step S11. The sheet P that does not have a matched image forming condition in the sheet DB 5 can obtain the optimum image forming condition.

When the printed image has met the printing quality (YES in step S12), the controller 600 determines whether or not the information on the sheet P set when the sheet P is printed is registered to the sheet DB 5 in step S13.

When the information on the sheet P is determined to be registered to the sheet DB 5 (YES in step S13), the information of the sheet P is stored in the sheet DB 5 in step S14, and ends the series of control for image formation.

It is to be noted that any brand of the sheet P not stored in the sheet DB 5 is registered to the sheet DB 5 with the optimal image forming condition after the condition is found.

By contrast, when the information on the sheet P set for the printing operation is determined is not to be registered to the sheet DB 5 (NO in step S13), the controller 600 ends the series of control for image formation without registering the information of the sheet P to the sheet DB 5.

FIG. 18 is a table explaining about a sheet DB 5.

As shown in the table of FIG. 18, the sheet DB 5 stores three categories of information of sheets, which are under names of sheets identifying information, sheets features information, and image forming condition information.

The sheets identifying information includes items such as name, size, weight, type, and coated/uncoated. The name column indicates names for types of sheets. The size column indicates sizes of the sheets. The weight column indicates thicknesses of the sheets. The type column indicates general or rough classification of sheets such as plain paper. The coated/uncoated column indicates whether the sheet is coated or uncoated.

Accordingly, the sheet DB 5 includes the sheets identifying information for identifying the sheets such as names, sizes, and types and the attribute information, so that a user can recognize the sheet.

The sheets features information is obtained by the information detector 100 and includes a combination of at least one information on the sheet. The number of parameters of the information and an information value are different depending on the detection mechanism of the information detector 100 provided in the image forming apparatus 2 even if the sheets are the same type.

It is to be noted that A through F of the sheets features information in the table of FIG. 18 correspond to the receivers 113, 114, 115, 118, and 160 and the thickness detecting sensor 170. In the table of FIG. 18, the number of parameters of the information that can obtained by the information detector 100 is 6. Further, the values of the information that can be obtained by the information detector 100 are output values output by the receivers 113, 114, 115, 118, and 160 and the thickness detecting sensor 170.

The image forming condition information stores information such as optimum transfer voltage values and fixing temperatures according to the types of the sheet and environmental condition (e.g., temperature and humidity).

FIG. 19 is a diagram illustrating an example of a display window showing results of sheet discrimination by the discrimination result selector 6.

The discrimination result selector 6 displays candidate sheets which are discriminated.

Further, the discrimination result selector 6 displays the sheets identifying information as the information with which a user discriminates the sheet P. The user selects the information on the sheet P based on the precision ratio and the sheets identifying information both of which are displayed on the discrimination result selector 6.

FIG. 20 is a diagram illustrating a display window showing a tray setting of the sheet information storing part 8.

The information on the sheet P stored in the sheet information storing part 8 is allocated to a given sheet feed tray via the control panel 200, as illustrated in FIG. 20, before sending to the image forming part 9. In FIG. 20, the information on the sheet P detected by the information detector 100 is allocated to the first sheet tray 415*a*.

By contrast, irrespective of brands of sheets, the second sheet tray 415*b* are allocated with general sheets information corresponding to information on size ("A3" in the table) and type ("Plain Paper" in the table).

Further, as illustrated in FIG. 20, the column of the first sheet tray 415*a* displays part of the sheets identifying information of the sheet P ("D MATTE" in the table) and the number assigned when stored in the sheet information storing part 8 ("1" in the table).

The above-described configurations are examples. This disclosure can achieve the following aspects effectively.

Aspect A.

In Aspect A, an image forming apparatus includes an information obtainer (for example, the information detector 100), a memory (for example, the sheet DB 5 and the sheet information storing part 8), a candidate determining unit (for example, the control panel 200), and an image forming device (for example, the image forming part 9). The information obtainer obtains feature information of a target recording medium (for example, the sheet P) from the target recording medium. The memory stores at least one set of recording medium information regarding the target recording medium associated with the feature information and at least one set of image forming condition information corresponding to the target recording medium information. The recording medium information is identification information that is discriminated from another recording medium. The candidate determining unit determines candidate recording medium information from the at least one set of the recording medium information stored in the memory based on the feature information of the target recording medium obtained by the information obtainer. The image forming device forms an image on the target recording medium based on the image forming condition information in the memory according to the candidate recording medium information determined by the candidate determining unit.

In Aspect A, the candidate determining unit determines the candidate recording medium information from the at least one set of the recording medium information stored in the memory based on the feature information of the target recording medium obtained by the information obtainer from the target recording medium used for image formation. Then, the image forming device performs image formation to the target recording medium based on the image forming condition information in the memory according to the recording medium information determined as the candidate. Accordingly, when compared with image formation performed under image forming conditions according to general or rough classification of sheets such as plain paper that can include multiple different types of sheets, the configuration can form an image under optical image forming conditions for the target recording medium distinguished from the other recording media.

Aspect B.

In Aspect A, the memory includes a first memory (for example, the sheet DB 5) and a second memory (for example, the sheet information storing part 8). The first memory stores at least one set of the recording medium information, the feature information corresponding to the recording medium information, and the image forming condition information. The second memory receives from the first memory and stores the candidate recording medium information determined by the candidate determining unit and the feature information and the image forming condition information corresponding to the candidate recording medium information.

Accordingly, as described in the examples above, the information restoration can be enhanced when restoring the first memory and the second memory in a case in which abnormality occurs in various information of sheets stored in the first memory and the second memory.

Aspect C.

In Aspect A or Aspect B, the image forming apparatus further includes a displaying unit (for example, the control panel 200) to display at least one candidate as the candidate recording medium information.

Accordingly, as described in the examples above, one or more candidates of the recording medium information can be informed to the user.

Aspect D.

In Aspect C, the image forming apparatus further includes a selecting unit (for example, the discrimination result selector 6) to receive a selected one of the recording medium information displayed on the displaying unit (for example, the control panel 200). The second memory (for example, the sheet information storing part 8) stores the recording medium information selected by the selecting unit, the feature information and the image forming condition information corresponding to the recording medium information.

Accordingly, as described in the examples above, the image forming condition can be set based on the recording medium information selected by the user with the selecting unit and stored in the second memory.

Aspect E.

In any one of Aspect A through Aspect D, the recording medium information includes a name of the target recording medium (for example, the sheet P).

Accordingly, as described in the examples above, the image forming condition can be set according to the name of the recording medium.

Aspect F.

In any one of Aspect A through Aspect E, the recording medium information includes a type of the target recording medium (for example, the sheet P).

Accordingly, as described in the examples above, the image forming condition can be set according to the type of the recording medium.

Aspect G.

In any one of Aspect A through Aspect F, the recording medium information includes a print setting to form the image on the target recording medium (for example, the sheet P).

Accordingly, the image forming condition can be set according to the print setting of the recording medium, for example, when allocating reduced images of multiple pages on a single sheet and/or when performing a simplex printing or a duplex printing.

Aspect H.

In any one of Aspect B through Aspect G, the image forming apparatus further includes an information revising unit (for example, the operation part 7) to revise the recording medium information, the feature information, and the image forming condition information stored in the first memory (for example, the sheet DB 5).

Accordingly, as described in the examples above, the optimum image forming condition can be set.

Aspect I.

In any one of Aspect B through Aspect H, the image forming apparatus further includes an information adding unit (for example, the operation part 7) to add the recording medium information, the feature information, and the image forming condition information to the first memory (for example, the sheet DB 5).

Accordingly, as described in the examples above, the optimum image forming condition can be set with respect to the recording medium when no recording medium information of the recording medium is stored in the first memory.

Aspect J.

In any one of Aspect B through Aspect I, the image forming apparatus further includes an image forming condition information adjusting unit (for example, the operation part 7) to adjust the image forming condition information stored in the second memory (for example, the sheet information storing part 8).

Accordingly, as described in the examples above, the optimum image forming condition can be set based on the image forming condition that is adjusted by the image forming condition information adjusting unit.

Aspect K.

In Aspect J, the image forming condition information stored in the second memory (for example, the sheet information storing part 8) and adjusted by the image forming condition information adjusting unit (for example, the operation part 7) is additionally stored in the first memory (for example, the sheet DB 5).

Accordingly, as described in the examples above, the optimum image forming condition can be set with respect to the recording medium when no optimum recording medium information of the recording medium is stored in the first memory.

Aspect L.

In any one of Aspect A through Aspect K, the image forming apparatus further includes multiple recording medium containers (for example, the first sheet tray 415*a*, the second sheet tray 415*b*) to contain the recording medium (for example, the sheet P). The recording medium information and the feature information and the image forming condition information corresponding to the recording medium information are set for each of the recording medium containers. The image forming device (for example, the image forming part 9) performs image formation based on the image forming condition information set to one of the recording medium containers that contains the target recording medium to be printed.

Accordingly, as described in the examples above, image formation can be performed under the image forming condition according to the recording medium when the image is printed on the recording medium by feeding the recording medium from the recording medium container that accommodates the recording medium to be printed.

Aspect M.

In Aspect L, the image forming apparatus further includes a container selecting unit (for example, the control panel 200) to select one of the recording medium containers (for example, the first sheet tray 415*a*, the second sheet tray 415*b*). The image forming device performs image formation based on the image forming condition information set to the one of the recording medium containers selected by the container selecting unit.

Accordingly, as described in the examples above, image formation can be performed based on the image forming condition according to the recording medium accommodated in the selected recording medium container.

Aspect N.

In any one of Aspect A through Aspect M, the image forming apparatus further includes a notifying unit (for example, the control panel 200) to notify when no candidate recording medium information of the recording medium information based on the feature information obtained by the information obtainer (for example, the information detector 100) is found from at least one set of the recording medium information stored in the memory (for example, the sheet DB 5 and the sheet information storing part 8).

Accordingly, as described in the examples above, the notifying unit can notify the user that no candidate recording medium information is found.

Aspect O.

In any one of Aspect A through Aspect N, the feature information of the target recording medium (for example, the sheet P) is sent to the second memory (for example, the sheet information storing part 8) when no candidate recording medium information of the recording medium information based on the feature information obtained by the information obtainer (for example, the control panel 200) is found from at least one set of the recording medium information stored in the first memory (for example, the sheet DB 5).

Accordingly, as described in the examples above, the image forming condition can be set from known general information such as types of sheets based on the feature information of the target recording medium obtained by the information obtainer (for example, the information detector 100).

Aspect P.

In Aspect O, the image forming apparatus further includes an information setting unit (for example, the operation part 7) to set the recording medium information and the image forming condition information with respect to the feature information of the target recording medium (for example, the sheet P) sent to the second memory (for example, the sheet information storing part 8).

Accordingly, as described in the examples above, the image formation can be performed based on the recording medium information and the image forming condition information with respect to the feature information of the target recording medium.

Aspect Q.

In Aspect P, the recording medium information, the feature information and the image forming condition information corresponding to new recording medium information based on the information stored in the second memory (for example, the sheet information storing part 8) and set by the information setting unit (for example, the operation part 7) is additionally stored in the first memory (for example, the sheet DB 5).

Accordingly, as described in the examples above, the image formation can be performed under the optimum image forming condition according to the new recording medium information added to the first memory based on the information stored in the second memory.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image forming apparatus comprising:
    an information detector configured to obtain feature information for a target sheet;
    a memory configured to store at least two sets of sheet information regarding the target sheet associated with the feature information and image forming condition information corresponding to the sheet information, the at least two sets of sheet information being identification information that is discriminated from another sheet;
    an image forming device configured to form an image on the target sheet based on the image forming condition information corresponding to the sheet information;
    a control panel including an input device configured to receive input information from a user; and
    at least one processor configured to,
        determine whether at least one set of candidate sheet information applicable to the target sheet from the at least two sets of sheet information is stored in the memory based on the feature information of the target sheet obtained by the information detector, and
        in response to at least two sets of candidate sheet information applicable to the target sheet being stored in the memory,
        display, on the control panel, a precision ratio of the feature information obtained by the information detector and the feature information stored in the memory together with the at least two sets of candidate sheet information applicable to the target sheet, and
        receive, via the input device, the input information indicating a selected one of the at least two sets of candidate sheet information displayed on the control panel,
    wherein the image forming device is configured to form the image on the target sheet based on the image forming condition information stored in the memory according to the selected one of the at least two sets of candidate sheet information.

2. The image forming apparatus according to claim 1, wherein
    the control panel includes a display window, and the at least one processor is configured to display, in the display window, at least two sets of the candidate sheet information in order of higher precision ratio from top of the display window.

3. The image forming apparatus according to claim 1, wherein the memory includes:
a first memory configured to store at least two sets of the sheet information, the feature information and the image forming condition information corresponding to the sheet information, and
a second memory configured to receive from the first memory and store the candidate sheet information, the feature information and the image forming condition information corresponding to the candidate sheet information.

4. The image forming apparatus according to claim 3, wherein the candidate sheet information selected by the at least one processor, the feature information and the image forming condition information corresponding to the sheet information are stored in the second memory.

5. The image forming apparatus according to claim 3, wherein the at least one processor is further configured to revise the candidate sheet information, the feature information, and the image forming condition information stored in the first memory.

6. The image forming apparatus according to claim 3, wherein the at least one processor is further configured to additionally store the candidate sheet information, the feature information and the image forming condition information in the first memory.

7. The image forming apparatus according to claim 3, wherein the at least one processor is further configured to adjust the image forming condition information stored in the second memory.

8. The image forming apparatus according to claim 7, wherein the image forming condition information adjusted by the at least one processor and stored in the second memory is additionally stored in the first memory.

9. The image forming apparatus according to claim 3, wherein the feature information of the target sheet is sent to the second memory when no candidate sheet information applicable to the target sheet based on the feature information obtained by the information detector is found from at least two sets of the candidate sheet information stored in the first memory.

10. The image forming apparatus according to claim 9, wherein the at least one processor is further configured to set the candidate sheet information and the image forming condition information with respect to the feature information of the target sheet sent to the second memory.

11. The image forming apparatus according to claim 10, wherein the candidate sheet information, the feature information and the image forming condition information corresponding to new candidate sheet information based on information set by the at least one processor and stored in the second memory is additionally stored in the first memory.

12. The image forming apparatus according to claim 1, wherein the candidate sheet information includes a name of the target sheet.

13. The image forming apparatus according to claim 1, wherein the candidate sheet information includes a type of the target sheet.

14. The image forming apparatus according to claim 1, wherein the candidate sheet information includes a print setting to form the image on the target sheet.

15. The image forming apparatus according to claim 1, further comprising:
multiple sheet containers configured to contain sheets, wherein
the candidate sheet information, the feature information and the image forming condition information corresponding to the candidate sheet information are set for each of the multiple sheet containers, and
the image forming device is configured to perform image formation based on the image forming condition information set to one of the multiple sheet containers that contains the target sheet to be printed.

16. The image forming apparatus according to claim 15, wherein
the control panel is configured to select one of the multiple sheet containers, and
the image forming device is configured to perform image formation based on the image forming condition information set to the one of the multiple sheet containers selected in the control panel.

17. The image forming apparatus according to claim 1, wherein the at least one processor is further configured to notify when no candidate sheet information applicable to the target sheet based on the feature information obtained by the information detector is found from at least two sets of the candidate sheet information stored in the memory.

* * * * *